(12) United States Patent
Qian et al.

(10) Patent No.: US 12,148,307 B2
(45) Date of Patent: Nov. 19, 2024

(54) COMPUTATION LOAD DISTRIBUTION

(71) Applicant: SZ DJI TECHNOLOGY CO., LTD., Shenzhen (CN)

(72) Inventors: Jie Qian, Shenzhen (CN); Lei Zhu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 778 days.

(21) Appl. No.: 17/030,022

(22) Filed: Sep. 23, 2020

(65) Prior Publication Data

US 2021/0018938 A1   Jan. 21, 2021

Related U.S. Application Data

(63) Continuation of application No. PCT/CN2019/114457, filed on Oct. 30, 2019.

(51) Int. Cl.
*G08G 5/00*   (2006.01)
*G01C 21/00*   (2006.01)
(Continued)

(52) U.S. Cl.
CPC ....... *G08G 5/0013* (2013.01); *G01C 21/3804* (2020.08); *G01S 19/42* (2013.01);
(Continued)

(58) Field of Classification Search
CPC .. G08G 5/0013; G08G 5/0034; G08G 5/0021; G08G 5/0026; G08G 5/0052; G08G 5/0069; G08G 5/045; G01C 21/3804; G01C 21/34; G01S 19/42; G01S 5/0027; G01S 5/16; G05D 1/0022; G05D 1/0038; G05D 1/106; G06T 7/11; G06T 2200/16;
(Continued)

(56) References Cited

U.S. PATENT DOCUMENTS

| 10,110,814 B1 | 10/2018 | Day |
| 2017/0372618 A1 | 12/2017 | Xu et al. |

(Continued)

FOREIGN PATENT DOCUMENTS

| CN | 102193559 A | 9/2011 |
| CN | 103812052 A | 5/2014 |

(Continued)

OTHER PUBLICATIONS

Jakob Engel, et al., "LSD-SLAM: Large-Scale Direct Monocular SLAM", In: Proceedings of ECCV 2014 (also published as "Lecture Notes in Computer Science, vol. 8690"), 2014, [online], Springer, pp. 834-849.

(Continued)

*Primary Examiner* — Meng Vang
(74) *Attorney, Agent, or Firm* — ANOVA LAW GROUP, PLLC

(57) ABSTRACT

A computation load distribution method includes determining a processing task associated with a mobile vehicle, and determining one or more processing resources for performing the processing task based at least partially on characteristics of the processing task. Determining the one or more processing resources includes determining whether to perform the processing task locally at the mobile vehicle and/or remotely at a remote terminal.

20 Claims, 8 Drawing Sheets

(51) Int. Cl.
  *G01S 19/42* (2010.01)
  *G05D 1/00* (2006.01)
  *G06T 7/11* (2017.01)
  *H04L 67/1008* (2022.01)
  *H04L 67/12* (2022.01)
  *H04N 7/18* (2006.01)

(52) U.S. Cl.
  CPC ......... *G05D 1/0022* (2013.01); *G05D 1/0038* (2013.01); *G05D 1/106* (2019.05); *G06T 7/11* (2017.01); *G08G 5/0034* (2013.01); *H04L 67/1008* (2013.01); *H04L 67/12* (2013.01); *H04N 7/185* (2013.01); *G06T 2200/16* (2013.01)

(58) Field of Classification Search
  CPC ....... G06T 1/20; H04L 67/1008; H04L 67/12; H04L 67/52; H04L 67/025; H04N 7/185; G06F 9/5044; G06F 2209/501; G06F 2209/509; G06F 9/5027; G06F 9/505; G06F 9/5094; G06F 9/4881; G06F 9/5011; G06F 9/5038; G06F 16/29; G06F 2209/484; G06F 2209/5021; Y02D 10/00
  USPC .......................................................... 701/2
  See application file for complete search history.

(56) References Cited

U.S. PATENT DOCUMENTS

| | | | |
|---|---|---|---|
| 2018/0276049 A1 | 9/2018 | Kattepur et al. | |
| 2018/0288137 A1* | 10/2018 | Veeramani | H04L 67/34 |
| 2018/0322749 A1 | 11/2018 | Kempel et al. | |
| 2020/0169666 A1* | 5/2020 | Gnoth | G08G 5/0069 |

FOREIGN PATENT DOCUMENTS

| | | | |
|---|---|---|---|
| CN | 108170158 | A | 6/2018 |
| CN | 108958286 | A | 12/2018 |
| CN | 109542110 | A | 3/2019 |
| CN | 109562829 | A | 4/2019 |
| CN | 109765927 | A | 5/2019 |
| JP | H11239353 | A | 8/1999 |
| JP | H11261545 | A | 9/1999 |
| JP | 2001160062 | A | 6/2001 |
| JP | 2003501902 | A | 1/2003 |
| JP | 2003060652 | A | 2/2003 |
| JP | 2003348431 | A | 12/2003 |
| JP | 2010095246 | A | 4/2010 |
| JP | 2014505432 | A | 2/2014 |
| JP | 2016082441 | A | 5/2016 |
| JP | 2017538098 | A | 12/2017 |
| JP | 2018110304 | A | 7/2018 |
| JP | 2019131332 | A | 8/2019 |
| JP | 2019185689 | A | 10/2019 |
| KR | 20190030589 | A | 3/2019 |
| WO | 2018018632 | A1 | 2/2018 |

OTHER PUBLICATIONS

1. Keisuke Hatake, "Inspection implementation of wind power generation equipment by wired drone", Journal of Japan Wind Energy Society, vol. 41, No. 1 (vol. 121), Japan Wind Energy Society, May 2017, pp. 128-130.
Fumitaka Ono, "Standardization trend of still image coding", Journal of Image Electronics Society, vol. 30, No. 3, Image Electronics Society, May 25, 2001, pp. 212-219.
The World Intellectual Property Organization (WIPO) International Search Report and Written Opinion for PCT/CN2019/114457 Feb. 1, 2020 11 pages.

* cited by examiner

COMPUTATION LOAD DISTRIBUTION

CROSS-REFERENCE TO RELATED APPLICATION

This application is a continuation of International Application No. PCT/CN2019/114457, filed Oct. 30, 2019, the entire content of which is incorporated herein by reference.

TECHNICAL FIELD

The present disclosure relates to the field of computing technology and, more specifically, to a method and apparatus for distributing a computation load, a method and apparatus for data processing, and a mobile vehicle.

BACKGROUND

With the advancement in aerial photography aircraft, consumers are becoming more demanding with the functions, endurance, weight, and volume of the aerial photography aircraft. Further, with the increasing use of unmanned aerial vehicles (UAVs), various authorities have set rules and regulations on the aerial vehicles. For example, in Europe, for an aerial vehicle exceeding a weight of 250 g, the operator of the aerial vehicle need to pass an exam in order to operate the aerial vehicle.

Moreover, consumers are becoming more demanding on the intelligent functions of the aerial vehicles, such as intelligent following, visual obstacle avoidance, intelligent return, and route planning, and these functions need to be supported by a powerful computing platform. In conventional technology, the power consumption of a hardware platform of the aerial vehicle that can meet the requirements of the above functions is as high as approximately 15 W. Since the battery energy density has reached a limitation in conventional technology, the power consumption level of the computing platform has limited the miniaturization and the extended flight of the aerial aircraft.

Further, as the chip manufacturing process approaches the limits of the law of physics, the failure of Moore's Law is likely to happen in the future. As such, it is increasingly difficult to rely on the advances in semiconductor processes to reduce power consumption and improve computing performance. Therefore, the user demand of intelligence, miniaturization, and extended flight of the aerial vehicle is contradicting with the progress of semiconductor technology.

SUMMARY

An aspect of the present disclosure provides a computation load distribution method. The computation load distribution method includes determining a processing task associated with a mobile vehicle, and determining one or more processing resources for performing the processing task based at least partially on characteristics of the processing task. Determining the one or more processing resources includes determining whether to perform the processing task locally at the mobile vehicle and/or remotely at a remote terminal.

Another aspect of the present disclosure provides a computation load distribution apparatus. The computation load distribution apparatus includes a processor and a memory storing a computer program. The computer program, when executed by the processor, causes the processor to determine a processing task associated with a mobile vehicle, and determine one or more processing resources for performing the processing task based at least partially on characteristics of the processing task, including determining whether to perform the processing task locally at the mobile vehicle or remotely at a remote terminal.

Another aspect of the present disclosure provides an aerial vehicle. The aerial vehicle includes a propulsion system configured to provide a moving force for the aerial vehicle, a processor, and a memory storing a computer program. The computer program, when executed by the processor, causes the processor to determine a processing task associated with the aerial vehicle, and determine one or more processing resources for performing the processing task based at least partially on characteristics of the processing task, including whether to perform the processing task locally at the aerial vehicle or remotely at a remote terminal.

Another aspect of the present disclosure provides a data processing method. The data processing method includes splitting a processing task into a plurality of subtasks, and assigning the plurality of subtasks to at least one of a mobile vehicle or a remote terminal for processing based on at least a characteristic of the plurality of subtasks.

Another aspect of the present disclosure provides a data processing apparatus. The data processing apparatus includes a processor and a memory storing a computer program. The computer program, when executed by the processor, causes the processor to split a processing task into a plurality of subtasks, and assign the plurality of subtasks to at least one of the mobile vehicle or a remote terminal for processing based on at least a characteristic of the plurality of subtasks.

Another aspect of the present disclosure provides a mobile vehicle. The mobile vehicle includes one or more processors configured to, individually or collectively split a processing task into a plurality of subtasks, and assign the plurality of subtasks to at least one of the mobile vehicle or a remote terminal for processing based on at least a characteristic of the plurality of subtasks.

DETAILED DESCRIPTION OF THE EMBODIMENTS

The technical solutions provided in the embodiments of the present disclosure will be described below with reference to the drawings. However, it should be understood that the following embodiments do not limit the disclosure. It will be appreciated that the described embodiments are some rather than all of the embodiments of the present disclosure. Other embodiments conceived by those having ordinary skills in the art on the basis of the described embodiments without inventive efforts should fall within the scope of the present disclosure. In the situation where the technical solutions described in the embodiments are not conflicting, they can be combined. It should be noted that technical solutions provided in the present disclosure do not require all combinations of the features described in the embodiments of the present disclosure.

In view of the increasing demands on the functions, endurance, weight, and volume of the aerial aircraft, and the battery capacity and chip processing power, the present disclosure provides a method and apparatus for distributing a computation load. The computation load distribution method and apparatus of the present disclosure uses a data transmission link or a telecommunication network to distribute the computation load between a remote terminal and a mobile vehicle to reduce the computation load on the mobile vehicle, thereby reducing the power consumption, weight, and size of the mobile vehicle while improving the intelligence, endurance of the mobile vehicle.

Figure 1:
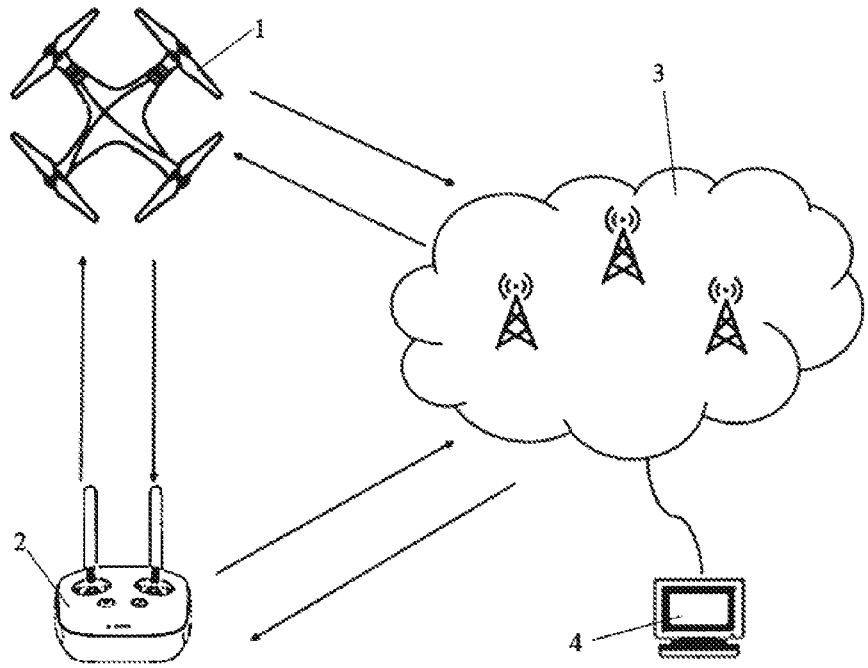
FIG. 1 is a schematic diagram of a system according to an embodiment of the present disclosure.

FIG. 1 is a schematic diagram of an example system according to an embodiment of the present disclosure. As shown in FIG. 1, the system includes a mobile vehicle 1 and a remote terminal 2. In some other embodiments, the system can include two or more mobile vehicles 1 and/or two or more remote terminals 2. The computation load distribution method of the present disclosure may be implemented in the system shown in FIG. 1, such as by the mobile vehicle 1 and/or the remote terminal 2. As shown in FIG. 1, one or more transmission links are established between the mobile vehicle 1 and the remote terminal 2. The one or more transmission links can include at least one of an image transmission link configured to transmit images or a data transmission link configured to transmit data other than images, such as position data or instruction data.

The one or more transmission links can include a direct transmission link between the mobile vehicle 1 and the remote terminal 2, and/or an indirect transmission link via a communication network 3. In some embodiments, as shown in FIG. 1, the system further includes a server 4. In the example shown in FIG. 1, the server 4 is connected to the mobile vehicle 1 and the remote terminal 2 via the communication network 3. In some other embodiments, the server can be connected to the vehicle 1 and/or the remote terminal 2 via one or more direct transmission links.

In some embodiments, the mobile vehicle 1 may be, e.g., an aerial vehicle (such as an unmanned aerial vehicle (UAV)), an unmanned ground vehicle, or a ground remote control robot. In some embodiments, the mobile vehicle 1 consistent with embodiments of the present disclosure may be used to, e.g., perform various tasks in the fields of electric power line monitoring, communication, meteorology, agriculture, oceanography, exploration, photography, disaster prevention and mitigation, crop estimation, smuggling prevention, border patrol, security, and/or counter-terrorism.

In some embodiments, a carrier may be arranged on the mobile vehicle 1 to carry a payload. In some embodiments, the carrier may be a gimbal, and the payload may be one or more of a camera and a mechanical arm.

The remote terminal 2 may be any device that can communicate with the mobile vehicle 1. In some embodiments, the remote terminal 2 may be a handheld device (e.g., a smartphone or a tablet), a remote controller, a ground control device, or a cloud computation platform. In some embodiments, the remote terminal 2 may be configured to transmit a control instruction of the mobile vehicle 1 to the mobile vehicle 1. In some embodiments, the control instruction may be used to control a motion state of the mobile vehicle 1. Further, the motion state of the mobile vehicle 1 may include one or more of a moving direction, a moving speed, and an attitude of the mobile vehicle 1. In some embodiments, the control instruction may be used to control a state of the carrier of the mobile vehicle 1. Further, the state of the carrier of the mobile vehicle 1 may include one or more of an attitude and a working mode of the carrier.

The one or more transmission links between the remote terminal 2 and the mobile vehicle 1 can allow the remote terminal 2 to communicate with the mobile vehicle 1 to facilitate data exchange with the mobile vehicle 1. In some embodiments, a transmission link may include a Wi-Fi link, a software-defined radio (SDR) link, or a telecommunication network.

Figure 2:
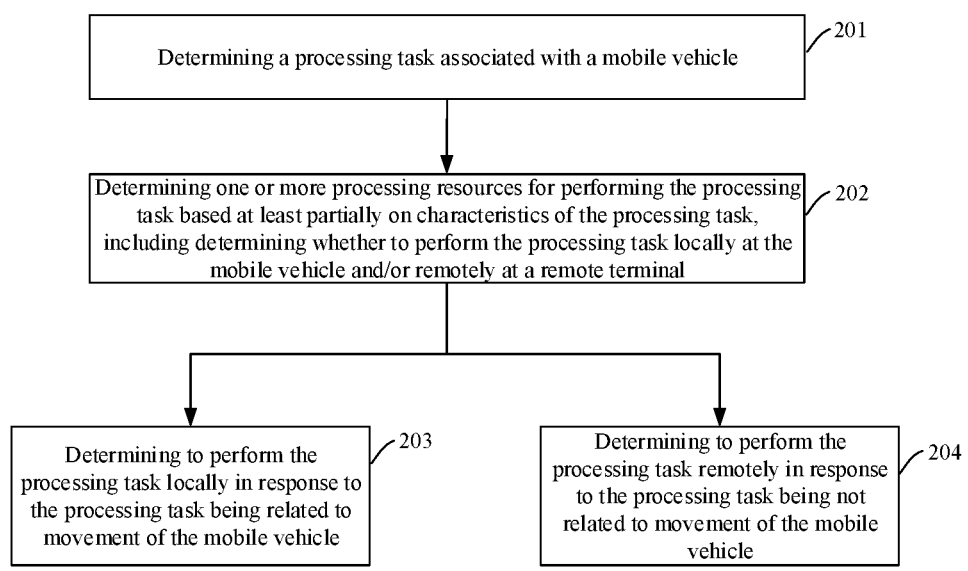
FIG. 2 is a flowchart of a computation load distribution method according to an embodiment of the present disclosure.

FIG. 2 is a flowchart of an example computation load distribution method according to an embodiment of the present disclosure. As shown in FIG. 2, at 201, a processing task associated with a mobile vehicle is determined. At 202, whether to perform the processing task locally at the mobile vehicle and/or remotely at a remote terminal is determined based on at least partially on characteristics of the processing task.

The processing task associated with the mobile vehicle may be a task that is associated with a component or a payload of the mobile vehicle. For example, the component of the mobile vehicle may be a global position system (GPS) receiver, and the payload may be a camera. In some embodiments, the processing task associated with the mobile vehicle may include one or more of an image acquisition task, an image processing task, an image recognition task, a route query task, and an obstacle avoidance task.

If the processing task is related to movement of the mobile vehicle, then the processing task is performed locally at the mobile vehicle (203). On the other hand, if the processing task is not related to movement of the mobile vehicle, then the processing task is performed remotely at the remote terminal (204).

The mobile vehicle and the remote terminal of the present disclosure may each include a processor. The processors of the mobile vehicle and the remote terminal may be configured to perform the processing task associated with the mobile vehicle, and generate the corresponding processing result. In some embodiments, the processing power of the processor of the mobile vehicle may be lower than the processing power of the processor of the remote terminal. As such, whether to perform the processing task locally at the mobile vehicle and/or remotely at the remote terminal may be determined based at least partially on characteristics of the processing task, which may determine, e.g., how much processing power is needed.

In some embodiments, a characteristic of the processing task may be related to the movement of the mobile vehicle. On the one hand, if it is determined to perform the processing task locally at the mobile vehicle, the processing task may be performed by using the processor of the mobile vehicle to generate the processing result. In some embodiments, the processing task may be performed immediately using the processor of the mobile vehicle. As such, the time it takes to generate the processing result may be relatively short. On the other hand, if it is determined to perform the processing task remotely at the remote terminal, at least one of data or instructions related to the processing task may need to be first transmitted to the remote terminal by using the transmission link between the mobile vehicle and the remote terminal described above. After receiving the data and/or instructions related to the processing task, the processor of the remote terminal may perform the processing task and generate the processing result, then the processing result may be transmitted to the mobile vehicle. As such, the time taken to generate the processing result at the remote terminal may be longer than the time taken to generate the processing result at the mobile vehicle. Since the movement of the mobile vehicle can be closely related to the safety of the mobile vehicle, the processing task related to the movement of the mobile vehicle can be performed locally at the mobile vehicle. On the other hand, if the processing task is not related to the movement of the mobile vehicle, the processing task may be performed remotely at the remote terminal.

In some embodiments, before the at least one of data or instructions is transmitted to the remote terminal, auxiliary information may be added to the at least one of data or instructions. The auxiliary information may include one or more of a timestamp, information related to one or more of an attitude, a speed, and a position of the mobile vehicle, and information related to an attitude of a carrier arranged at the mobile vehicle. As such, time synchronization and data synchronization may be achieved.

In some embodiments, a characteristic of the processing task may be related to a data processing amount of the processing task. Since the processing power of the processor of the mobile vehicle may be weaker than the processing power of the processor of the remote terminal, the processing task may be performed at the remote terminal if the data processing amount of the processing task (the amount of data processed by the processing task) is greater than a predetermined data processing amount threshold. On the other hand, the processing task may be performed at the mobile vehicle if the data processing amount of the processing task is less than the predetermined data processing amount threshold.

In some embodiments, a characteristic of the processing task may be related to a data processing speed of the processing task. Since the processing power of the processor of the mobile vehicle may be less than the processing power of the processor of the remote terminal, the processing task may be performed at the remote terminal if the data processing speed of the processing task (the data processing speed needed for performing the processing task) is greater than a predetermined data processing speed threshold. On the other hand, the processing task may be performed at the mobile vehicle if the data processing speed of the processing task is less than the predetermined data processing speed threshold.

In some embodiments, a characteristic of the processing task may be related to a data storage amount of the processing task. Due to the weight limit on the mobile vehicle, the data storage capacity of the mobile vehicle may be lower than the data storage capacity of the remote terminal. As such, the processing task may be performed at the remote terminal if the data storage amount of the processing task (the data storage amount/space needed for storing data associated with the processing task, such as initial data for being processed by the processing task, intermediate data generated during the processing task, and/or final data generated as a result of the processing task) is greater than a predetermined data storage amount threshold. On the other hand, the processing task may be performed at the mobile vehicle if the data storage amount of the processing task is less than the predetermined data storage amount threshold.

In some embodiments, a characteristic of the processing task may be related to an electric power needed for the processing task. Due to the weight limit on the mobile vehicle, the capacity of the power supply of the mobile vehicle may be limited, which may even be smaller than the capacity of the power supply of the remote terminal. As such, the processing task may be performed at the remote terminal if the electric power needed for the processing task is greater than a predetermined electric power threshold. On the other hand, the processing task may be performed at the mobile vehicle if the electric power needed for the processing task is less than the predetermined electric power threshold.

Figure 3:
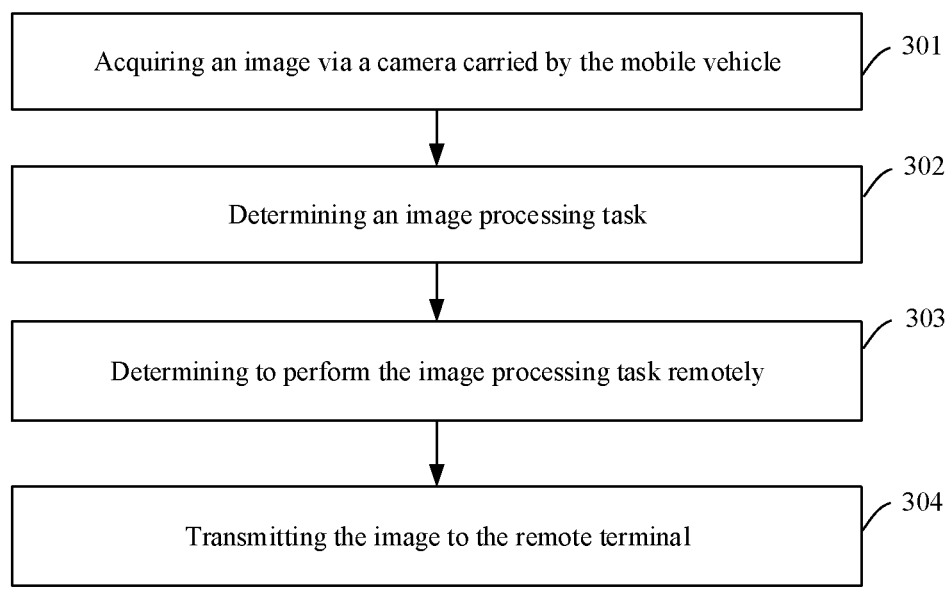
FIG. 3 is a flowchart of an application of the computation load distribution method according to an embodiment of the present disclosure.

FIG. 3 is a flowchart of an application of the computation load distribution method according to an embodiment of the present disclosure. In this embodiment, the payload of the mobile vehicle may be a camera, and the processing task may be an image processing task. As shown in FIG. 3, at 301, an image is acquired via a camera carried by the mobile vehicle. At 302, it is determined that the processing task includes an image processing task.

In some embodiments, the camera carried by the mobile vehicle may be used to acquire an image of, e.g., the surrounding of the mobile vehicle. In some embodiments, the image may be subject to an image processing task. For example, the image may be used to determine the position of the mobile vehicle to achieve, e.g., obstacle avoidance and/or route planning. In some embodiments, the image may not be subject to an image processing task. For example, the image may be simply acquired for video recording purpose.

At 303, it is determined to perform the image processing task remotely. In some embodiments, after it is determined that the image is subject to the image processing task, the image processing task may need to be performed remotely at the remote terminal.

At 304, the image is transmitted to the remote terminal. In some embodiments, after it is determined to perform the image processing task remotely at the remote terminal, the image may be transmitted to the remote terminal via the transmission link between the mobile vehicle and the remote terminal, such that the image processing task may be performed by the processor of the remote terminal.

In some embodiments, a region of interest (ROI) of the image may be determined before the image is transmitted to the remote terminal in order to reduce the time needed to perform the image processing task remotely at the remote terminal and to improve the accuracy of the image processing task. In some embodiments, determining the region of interest of the image may include identifying a coordinate of a target object in a previously-acquired image and determining a region in the image surrounding the coordinate of the target object as the region of interest. In some embodiments, the ROI, rather than the entire image, can be transmitted to the remote terminal. In some other embodiments, the ROI can be first transmitted and the remaining part of the image can be transmitted after the transmission of the ROI is completed. Transmitting the ROI only rather than the entire image or transmitting the ROI before transmitting other part of the image can reduce the time needed to perform the image processing task remotely at the remote terminal. In some embodiments, to improve the accuracy of the image processing task, the resolution of the ROI of the image may be increased while the resolution of the remaining part of the image may remain unchanged or be reduced. In some embodiments, the ROI of the image may be transmitted to the remote terminal for at least two times to further ensure the accuracy of the image processing task.

In order to optimize the use of the processing power of the mobile vehicle, in some embodiments, transmitting the image to the remote terminal may include transmitting the image to the remote terminal without performing an image signal processing (ISP) on the image. As such, the image may be directly transmitted from a sensor of the camera to an idle channel of the transmission link, such as an idle channel of the image transmission link, and then to the remote terminal via that channel such that the image can be processed by an image processor of the mobile vehicle.

In some embodiments, in order to alleviate the computation load on the processor of the remote terminal, a preliminary processing may be performed by using the processor of the mobile vehicle on the image before the image is transmitted to the remote terminal. As such, the computation load of the remote terminal may be partly distributed to the mobile vehicle. In some embodiments, the preliminary processing may include one or more of a compression, a resolution reduction, and split of the image. After the preliminary processing on the image is performed, the processed image may be transmitted to the remote terminal for further processing.

After the remote terminal processes the image, a processing result may be generated and transmitted to the mobile terminal. In order to improve the synchronization between the remote terminal and the mobile vehicle, a timestamp may be added to the image to achieve time synchronization. Further, in order to improve the synchronization between the remote terminal and the mobile vehicle, auxiliary information may be added to the image to achieve data synchronization. In some embodiments, the auxiliary information includes movement information of the mobile vehicle. The movement information may include one or more of a position, a speed, and an attitude of the mobile vehicle. In some embodiments, the auxiliary information includes related information of components of the mobile vehicle. For example, the related information of the components of the mobile vehicle may include attitude information of the gimbal of the mobile vehicle.

Figure 4:
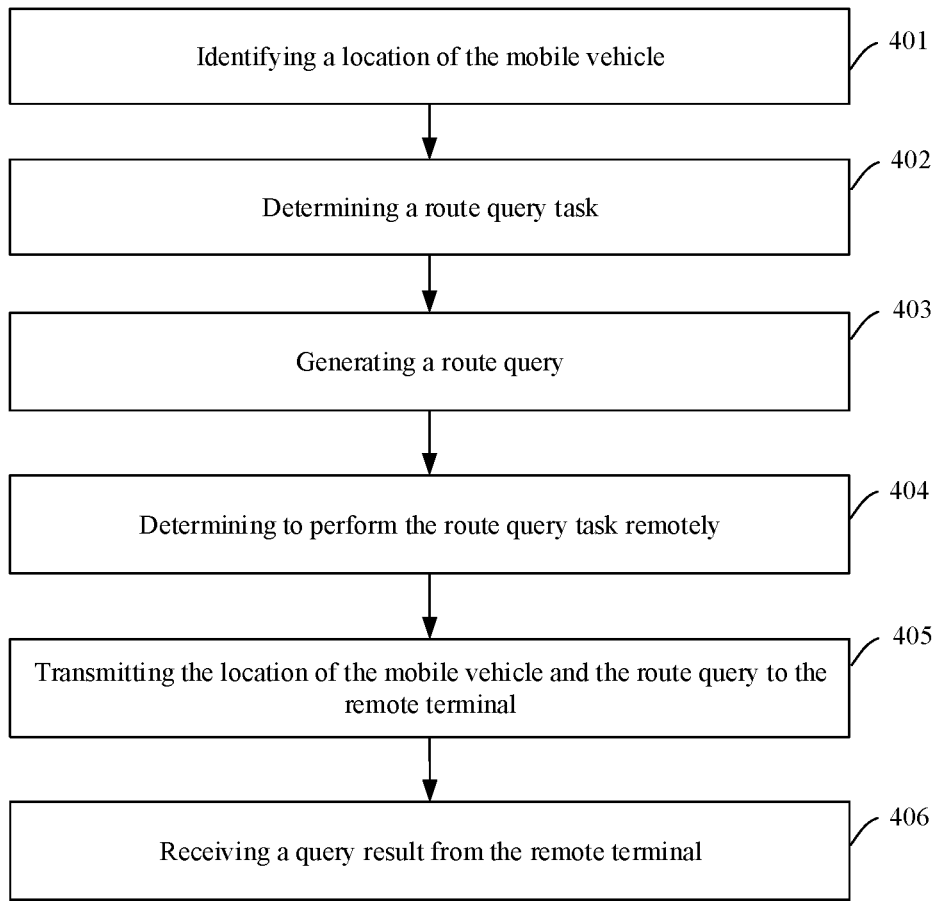
FIG. 4 is a flowchart of another application of the computation load distribution method according to another embodiment of the present disclosure.

FIG. 4 is a flowchart of another application of the computation load distribution method according to another embodiment of the present disclosure. In this embodiment, the payload of the mobile vehicle may be a detector, and the processing task may be a route query task. As shown in FIG. 4, at 401, a location of the mobile vehicle is identified. At 402, it is determined that the processing task includes a route query task. At 403, a route query is generated.

To ensure the operability of the mobile vehicle, an operator of the mobile vehicle may need to be aware of the location of the mobile vehicle in real time, such that the operator of the mobile vehicle may ensure that the mobile vehicle is moving along a planned route rather than deviating into a restricted space. As such, a route query task may be performed. In some embodiments, the mobile vehicle can carry a detector, such as a GPS receiver, which can identify the location of the mobile vehicle. In some embodiments, the detector may identify the location of the mobile vehicle in real time. In other embodiments, the detector may identify the location of the mobile vehicle at predetermined time intervals.

After the location of the mobile vehicle is identified, whether the location of the mobile vehicle is subject to a route query task can be determined. For example, the location of the mobile vehicle may be used to identify whether the mobile vehicle is moving along the planned route. When it is determined that the mobile vehicle is moving along the planned route, the mobile vehicle may continue to move along a planned path until the mobile vehicle reaches the destination. In some embodiments, if it is determined that the mobile vehicle is not moving along the planned route, the mobile vehicle may need to be re-routed to the planned path, such that the mobile vehicle may reach the destination.

At 404, it is determined to perform the route query task remotely. At 405, the location of the mobile vehicle and the route query are transmitted to the remote terminal.

In some embodiments, a map can be stored on the mobile vehicle, and route query can be performed on the mobile vehicle. In these embodiments, the mobile vehicle may need to store a large amount of data and perform heavy processing tasks such as route query, which may consume a lot of power. In some embodiments, after it is determined that the process task is a route query task, the route query task may be performed remotely at the remote terminal. In these embodiments, the location of the mobile vehicle and the route query may be transmitted to the remote terminal via the transmission link between the mobile vehicle and the remote terminal, such that the route query task may be performed by the processor of the remote terminal.

At 406, a query result from the remote terminal is received. In some embodiments, after the remote terminal receives the location of the mobile vehicle and the route query from the mobile vehicle, the processor of the remote terminal may be used to perform the route query task, generate a query result, and transmit the query result to the mobile vehicle. The query result can include, e.g., a current route of the mobile vehicle and/or various alternative routes for the mobile vehicle. The mobile vehicle can receive the query result and perform a further operation, such as re-routing the mobile vehicle, based on the query result. Further, after the mobile vehicle receives the query result from the remote terminal, the processor of the mobile vehicle may update the map stored in the mobile vehicle using a change in a depth map.

Figure 5:
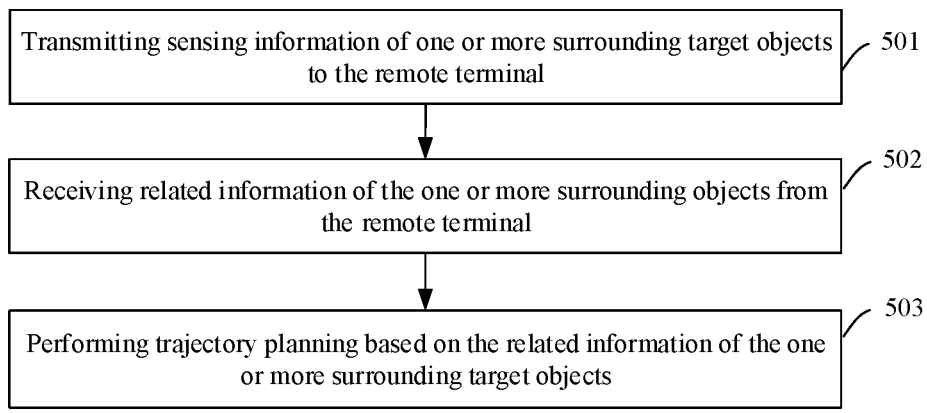
FIG. 5 is a flowchart of another application of the computation load distribution method according to another embodiment of the present disclosure.

FIG. 5 is a flowchart of another application of the computation load distribution method according to another embodiment of the present disclosure. In this embodiment, the computation load distribution method of the present disclosure may be used for a trajectory planning of the mobile vehicle.

As shown in FIG. 5, at 501, sensing information of one or more surrounding target objects is transmitted to the remote terminal via the transmission link described above. In some embodiments, the mobile vehicle can carry a sensor for sensing one or more target objects surrounding the mobile vehicle. The sensor may include any one or a combination of a visual sensor, a laser radar, a microwave radar, and an ultrasonic sensor. In some embodiments, the sensor may be used to acquire sensing information of the one or more surrounding target objects. In some embodiments, the sensing information may include one or more of a position, an attitude, a speed, and an object type of each of the one or more surrounding target objects.

At 502, related information of the one or more surrounding objects is received from the remote terminal. In some embodiments, after the remote terminal receives the sensing information of the one or more surrounding target objects, the remote terminal may identify the one or more target objects and acquire related information of the one or more surrounding objects. Subsequently, the remote terminal may transmit the related information of the one or more surrounding objects to the mobile vehicle via the transmission link between the mobile vehicle and the remote terminal. In some embodiments, the related information may include one or more of a position, an attitude, a speed, and an object type of each of the one or more surrounding target objects. Additionally or alternatively, the related information may include one or more of a position, an attitude, and a speed of each of the one or more surrounding target objects relative to the mobile vehicle.

At 503, a trajectory planning is performed based on the related information of the one or more surrounding objects. In some embodiments, after the mobile vehicle receives the related information of the one or more surrounding objects from the remote terminal, the mobile vehicle may perform the trajectory planning based on the related information of the one or more surrounding objects. In particular, the trajectory planning may include obstacle avoidance.

As discussed herein above, by distributing the computation load between a remote terminal and a mobile vehicle, the computation load on the mobile vehicle may be reduced, thereby reducing the power consumption, weight, and size of the mobile vehicle while improving the intelligence and/or endurance of the mobile vehicle.

Figure 6:
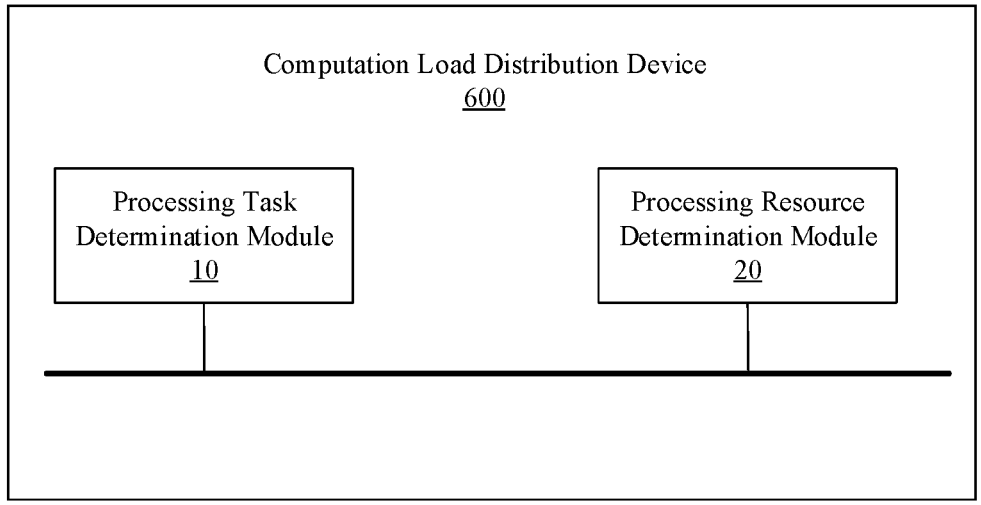
FIG. 6 is a block diagram of a computation load distribution device according to an embodiment of the present disclosure.

FIG. 6 is a block diagram of an example computation load distribution device 600 according to an embodiment of the present disclosure. As shown in FIG. 6, the computation load distribution device 600 includes a processing task determination module 10 and a processing resource determination module 20. The processing task determination module 10 may be communicatively connected to the processing resource determination module 20 through a direct or an indirect connection.

The processing task determination module 10 may be configured to determine a processing task associated with a mobile vehicle. The processing task associated with the mobile vehicle may be a task that is associated with a component or a payload of the mobile vehicle. For example, the component of the mobile vehicle may be a global position system (GPS) receiver, and the payload may be a camera. In some embodiments, the processing task associated with the mobile vehicle may include one or more of an image acquisition task, an image processing task, an image recognition task, a route query task, a trajectory planning task, and an obstacle avoidance task.

The processing resource determination module 20 may be configured to determine one or more processing resources for performing the processing task based at least partially on characteristics of the processing task by determining whether to perform the processing task locally at the mobile vehicle or remotely at a remote terminal. In some embodiments, if the processing task is related to movement of the mobile vehicle, then the processing task can be performed locally at the mobile vehicle. On the other hand, if the processing task is not related to movement of the mobile vehicle, then the processing task can be performed remotely at the remote terminal.

A transmission link may be established between the remote terminal and the mobile vehicle, such that the remote terminal may communicate with the mobile vehicle to facilitate data exchange with the mobile vehicle. The transmission link may be a direct transmission link or an indirect transmission link. In some embodiments, the transmission link may include a Wi-Fi link, a software-defined radio (SDR) link, or a telecommunication network. In addition, a server may be used as a relay station for forwarding data between the remote terminal and the mobile vehicle.

The mobile vehicle and the remote terminal of the present disclosure may each include a processing unit, e.g., one or more processors. The processing units of the mobile vehicle and the remote terminal may be configured to perform the processing task associated with the mobile vehicle, and generate the corresponding processing result. In some embodiments, the processing power of the processing unit of the mobile vehicle may be lower than the processing power of the processing unit of the remote terminal. As such, whether to perform the processing task locally at the mobile vehicle and/or remotely at the remote terminal may be determined based at least partially on characteristics of the processing task, which may determine, e.g., how much processing power is needed.

In some embodiments, a characteristic of the processing task may be related to the movement of the mobile vehicle. On the one hand, if the processing resource determination module 20 determines to perform the processing task locally at the mobile vehicle, the processing task may be performed at the mobile vehicle to generate the processing result. In some embodiments, the processing task may be performed immediately at the mobile vehicle. As such, the time taken to generate the processing result may be relatively short. On the other hand, if the processing resource determination module 20 determines to perform the processing task remotely at the remote terminal, at least one of data or instructions related to the processing task may need to be transmitted to the remote terminal by using the transmission link between the mobile vehicle and the remote terminal described above. After receiving the data and/or instructions related to the processing task, the processing task may be performed remotely at the remote terminal to generate the processing result, then the processing result may be transmitted to the mobile vehicle. As such, the time taken to generate the processing result at the remote terminal may be longer than the time taken to generate the processing result at the mobile vehicle. Since the movement of the mobile vehicle can be closely related to the safety of the mobile vehicle, the processing task related to the movement of the mobile vehicle can be performed locally at the mobile vehicle. On the other hand, if the processing task is not related to the movement of the mobile vehicle, the processing task may be performed remotely at the remote terminal.

In some embodiments, the computation load distribution device may further include an auxiliary information module. Before the at least one of data or instructions is transmitted to the remote terminal, the auxiliary information module may be configured to acquire and add auxiliary information to the at least one of data or instructions. For example, the auxiliary information module may include one or more sensors disposed on the mobile vehicle to sense different information of the mobile vehicle. In some embodiments, the auxiliary information may include one or more of a timestamp, information related to one or more of an attitude, a speed, and a position of the mobile vehicle, and information related to an attitude of a carrier arranged at the mobile vehicle. As such, time synchronization and data synchronization may be achieved.

Figure 7:
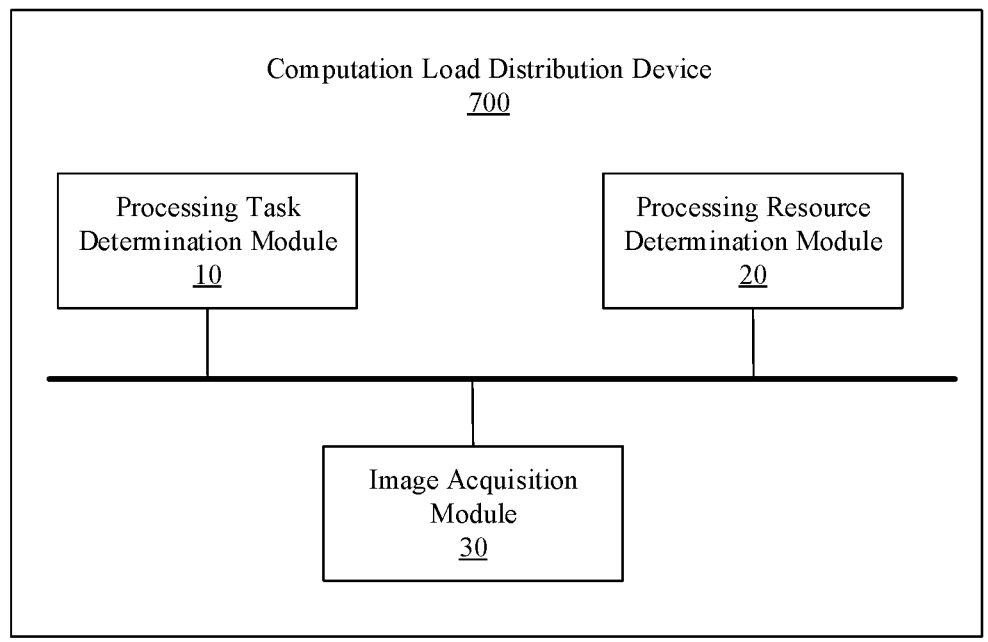
FIG. 7 is a block diagram of a computation load distribution device according to another embodiment of the present disclosure.

FIG. 7 is a block diagram of another example computation load distribution device 700 according to another embodiment of the present disclosure. As shown in FIG. 7, the computation load distribution device 700 includes the processing task determination module 10, the processing resource determination module 20, and an image acquisition module 30.

The image acquisition module 30 may be configured to receive an image of, e.g., the surrounding of the mobile vehicle captured by an imaging device, e.g., a camera, carried by the mobile vehicle. In some embodiments, the image may be subject to an image processing task. As such, the processing task determination module 10 may determine that the processing task includes an image processing task. In addition, the processing resource determination module 20 may determine to perform the image processing task remotely. After it is determined that the image is subject to the image processing task, the image processing task may need to be performed remotely at the remote terminal. As such, the image may be transmitted to the remote terminal through the transmission link, such that the image processing task may be performed by the processing unit of the remote terminal.

In some embodiments, a region of interest (ROI) of the image may be determined by using the processing unit of the mobile vehicle before the image is transmitted to the remote terminal in order to reduce the time needed to perform the image processing task remotely at the remote terminal and to improve the accuracy of the image processing task. In some embodiments, determining the region of interest of the image may include identifying a coordinate of a target object in a previously-acquired image and determining a region in the image surrounding the coordinate of the target object as the region of interest. In some embodiments, the ROI, rather than the entire image, can be transmitted to the remote terminal. In some other embodiments, the ROI can be first transmitted and the remaining part of the image can be transmitted after the transmission of the ROI is completed. Transmitting the ROI only rather than the entire image or transmitting the ROI before transmitting other part of the image can reduce the time needed to perform the image processing task remotely at the remote terminal. In some embodiments, to improve the accuracy of the image processing task, the resolution of the ROI of the image may be increased while the resolution of the remaining part of the image may remain unchanged or be reduced. In some embodiments, the ROI of the image may be transmitted to the remote terminal for at least two times to further ensure the accuracy of the image processing task.

In order to optimize the use of the processing power of the mobile vehicle, in some embodiments, transmitting the image to the remote terminal may include transmitting the image to the remote terminal without performing an image signal processing (ISP) on the image. As such, the image may be directly transmitted from a sensor of the camera to an idle channel of the transmission link and then to the remote terminal via that channel such that the image can be processed by the processing unit of the mobile vehicle.

In some embodiments, in order to alleviate the computation load on the processing unit of the remote terminal, a preliminary processing may be performed by using the processing unit of the mobile vehicle on the image before the image is transmitted to the remote terminal. As such, the computation load of the remote terminal may be partly distributed to the mobile vehicle.

Figure 8:
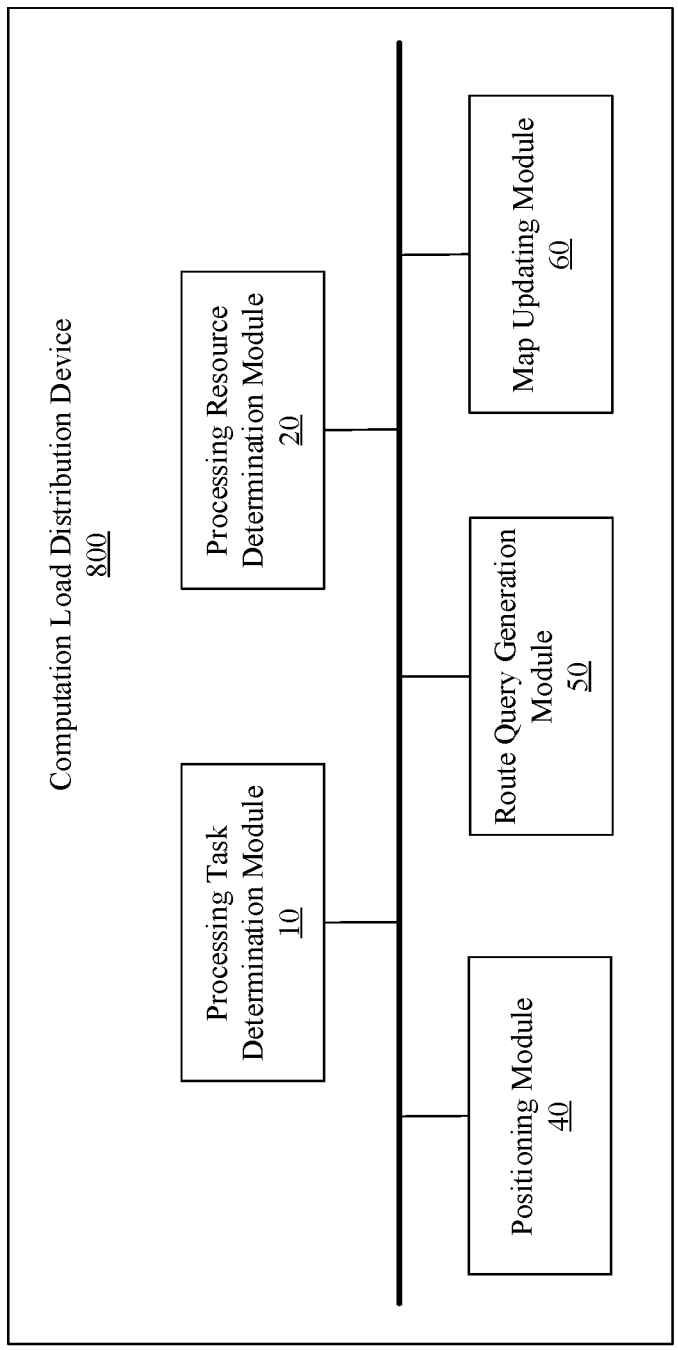
FIG. 8 is a block diagram of a computation load distribution device according to another embodiment of the present disclosure.

FIG. 8 is a block diagram of another example computation load distribution device 800 according to another embodiment of the present disclosure. As shown in FIG. 8, the computation load distribution device 800 includes the processing task determination module 10, the processing resource determination module 20, a positioning module 40, a route query generation module 50, and a map updating module 60.

The positioning module 40 may be configured to receive data regarding location of the mobile vehicle from a GPS receiver carried by the mobile vehicle. In some embodiments, the GPS receiver may identify the location of the mobile vehicle in real time. In other embodiments, the GPS receiver may identify the location of the mobile vehicle at predetermined time intervals.

After the location of the mobile vehicle is identified, whether the location of the mobile vehicle is subject to a route query task can be determined by the processing task determination module 10. When the processing task determination module 10 determines that the location mobile vehicle is subject to a route query task, the route query generation module 50 may be used to generate a route query. As such, the processing task determination module 10 may determine that the processing task includes a route query task, and the processing resource determination module 20 may determine to perform the route query task remotely. After it is determined that the location of mobile vehicle is subject to the route query task, the location of the mobile vehicle and the route query may be transmitted to the remote terminal through the transmission link.

After the remote terminal receives the location of the mobile vehicle and the route query from the mobile vehicle, the processing unit of the remote terminal may be used to perform the route query task, generate a query result, and transmit the query result to the mobile vehicle. The mobile vehicle can receive the query result and perform further operation, such as re-routing the mobile vehicle, based on the query result. As such, after the mobile vehicle receives the query result from the remote terminal, the map updating module 60 may be used to update the map stored in the mobile vehicle using a change in a depth map.

The computation load distribution device of the present disclosure may be used to implement part or all of a method consistent with the disclosure, such as one of the above-described example methods. For example, the computation load distribution device consistent with the disclosure can include one or more additional modules each being configured to perform one or more processes of a method consistent with the disclosure, such as one of the example methods described above. The implementation principles and technical effects of the computation load distribution device are same as or similar to those of a corresponding method, and hence details thereof are not described herein again.

Figure 9:
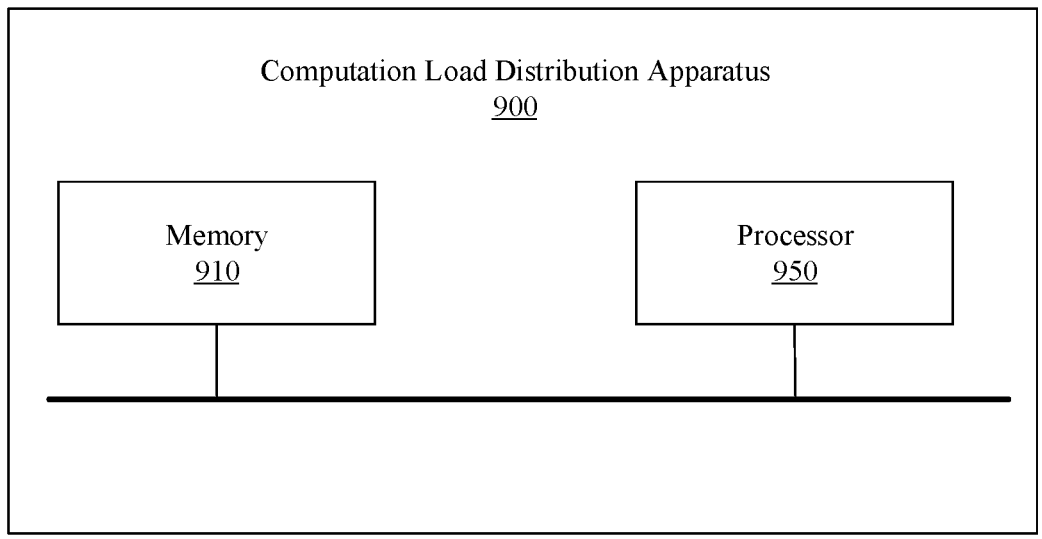
FIG. 9 is a structural diagram of a computation load distribution apparatus according to an embodiment of the present disclosure.

FIG. 9 is a schematic structural diagram of a computation load distribution apparatus 900 according to an embodiment of the present disclosure. The computation load distribution apparatus 900 is configured to perform a method consistent with the present disclosure, such as one of the example methods described in this disclosure. As shown in FIG. 9, the computation load distribution apparatus 900 includes a memory 910 storing a computer program and a processor 950 configured to execute the computer program to perform part or all of a method consistent with the present disclosure, such as one of the example methods described in this disclosure.

The memory 910 can include a computer readable storage medium, which can include at least one of a static random access memory (SRAM), a dynamic random access memory (DRAM), an erasable programmable read only memory (EPROM), an electrically erasable programmable read-only memory (EEPROM), or a flash memory such as a USB memory.

The processor 950 can include a central processing unit (CPU), a microprocessor (MPU), a digital signal processor (DSP), or a field programmable gate array (FPGA). In some embodiments, the processor 950 can execute the computer program stored in the memory 910 to determine a processing task associated with a mobile vehicle, and determine one or more processing resources for performing the processing task based at least partially on characteristics of the processing task, including whether to perform the processing task locally at the mobile vehicle 900 or remotely at a remote terminal.

In some embodiments, if the processing task is related to movement of the mobile vehicle, then the processing task is performed locally at the aerial vehicle. On the other hand, if the processing task is not related to movement of the mobile aerial vehicle, then the processing task is performed remotely at the remote terminal. In some embodiments, if it is determined to perform the processing task remotely at the remote terminal, at least one of data or instructions related to the processing task may need to be first transmitted to the remote terminal through a transmission link between the mobile vehicle and the remote terminal. After receiving the data and/or instructions related to the processing task, the remote terminal, such as through a processor thereof, can perform the processing task to generate a processing result, then the processing result may be transmitted to the mobile vehicle.

In some embodiments, the processor 950 may be further configured to add auxiliary information to the at least one of data or instructions before the at least one of data or instructions is transmitted to the remote terminal. The auxiliary information may include one or more of a timestamp, information related to one or more of an attitude, a speed, and a position of the mobile vehicle, and information related to an attitude of a carrier arranged at the mobile vehicle. As such, time synchronization and data synchronization may be achieved.

In some embodiments, a payload, such as a camera, carried by the mobile vehicle may be used to acquire an image of, e.g., the surrounding of the mobile vehicle 900. In some embodiments, the image may be subject to an image processing task. As such, the processor 950 may be configured to determine that the processing task includes an image processing task, and determine one or more processing resources by determining to perform the image processing task remotely. After it is determined that the image is subject to the image processing task, the image processing task may need to be performed remotely at the remote terminal.

In some embodiments, the processor 950 may be configured to determine a region of interest (ROI) of the image before the image is transmitted to the remote terminal. In some embodiments, determining the region of interest of the image may include identifying a coordinate of a target object in a previously-acquired image and determining a region in the image surrounding the coordinate of the target object as the region of interest. In some embodiments, the ROI, rather than the entire image, can be transmitted to the remote terminal. In some other embodiments, the ROI can be first transmitted and the remaining part of the image can be transmitted after the transmission of the ROI is completed. In some embodiments, to improve the accuracy of the image processing task, the resolution of the ROI of the image may be increased while the resolution of the remaining part of the image may remain unchanged or be reduced. In some embodiments, the ROI of the image may be transmitted to the remote terminal for at least two times to further ensure the accuracy of the image processing task.

In some embodiments, the payload may be a GPS receiver carried by the mobile vehicle. The GPS receiver may be configured to identify the location of the mobile vehicle. In some embodiments, the location of the mobile vehicle may be subject to a route query task. As such, the processor 950 may be configured to determine that the processing task includes a route query task, and determine one or more processing resources by determining to perform the route query task remotely. In addition, the processor 950 may be further configured to, if it is determined that the location of the mobile vehicle is subject to the route query task, generate a route query.

In some embodiments, the route query task may be performed at the remote terminal. As such, the location of the mobile vehicle and the route query may be transmitted to the remote terminal. After the remote terminal receives the location of the mobile vehicle and the route query from the mobile vehicle, the remote terminal may perform the route query task, generate a query result, and transmit the query result to the mobile vehicle. The mobile vehicle can receive the query result and perform further operation, such as re-routing the mobile vehicle, based on the query result. As such, the processor 950 may be further configured to update a map stored in the mobile vehicle (such as a storage device of the mobile vehicle) using a change in a depth map, after the mobile vehicle receives the query result from the remote terminal.

In some embodiments, in addition to the operations described above, the processor 950 can be further configured to perform other operations consistent with the disclosure. For example, the processor 950 can be further configured to execute part or all of a method consistent with the disclosure (that is not explicitly described to be executed by the processor 950), such as one of the example methods described in this disclosure. For the operation of the data processing apparatus 900, reference can be made to corresponding example methods described in this disclosure, and hence detailed description thereof is omitted.

Figure 10:
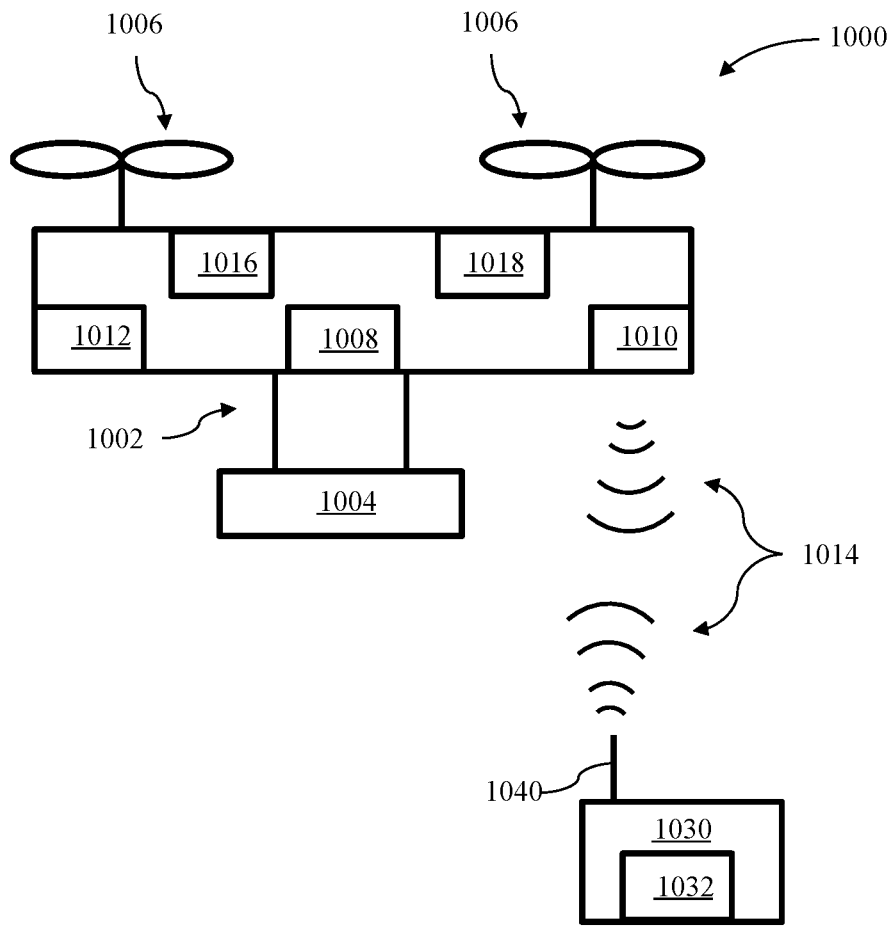
FIG. 10 is a schematic diagram showing a mobile vehicle and a remote terminal according to an embodiment of the present disclosure.

FIG. 10 is a schematic diagram showing an example mobile vehicle 1000 and an example remote terminal 1030 according to an embodiment of the present disclosure. The mobile vehicle 1000 can be, e.g., an aerial vehicle. Although the aerial vehicle is depicted as a rotorcraft in FIG. 10, this depiction is not intended to be limiting, and any suitable type of aerial vehicle can be used. One of skill in the art would appreciate that any of the embodiments described herein in the context of aircraft systems can be applied to any suitable aerial vehicle (e.g., a UAV).

As shown in FIG. 10, the mobile vehicle 1000 includes a carrier 1002 and a payload 1004. In some embodiment, the carrier 1002 may be a gimbal, and the payload 1004 may be one or more of a camera, a GPS receiver, and a mechanical arm. In some embodiments, the payload 1004 may be provided on the mobile vehicle 1000 without requiring the carrier 1002.

As shown in FIG. 10, the mobile vehicle 1000 further includes a propulsion system 1006, a processor 1008, a communication system 1010, and a memory 1012.

The propulsion system 1006 can include one or more of rotors, propellers, blades, engines, motors, wheels, axles, magnets, and nozzles. The mobile vehicle 1000 may have one or more, two or more, three or more, or four or more propulsion system. The propulsion system may all be of the same type. Alternatively, one or more propulsion system can be different types of propulsion system. The propulsion system 1006 can be mounted at the mobile vehicle 1000 using any suitable means, such as a support element (e.g., a drive shaft). The propulsion system 1006 can be mounted at any suitable portion of the mobile vehicle 1000, such as at the top, bottom, front, back, sides, or suitable combinations thereof.

In some embodiments, the propulsion system 1006 can enable the mobile vehicle 1000 to take off vertically from a surface or land vertically on a surface without requiring any horizontal movement of the mobile vehicle 1000 (e.g., without traveling down a runway). Optionally, the propulsion system 1006 can be operable to permit the mobile vehicle 1000 to hover in the air at a specified position and/or orientation. One or more of the propulsion system 1006 may be controlled independently of the other propulsion system. Alternatively, the propulsion system 1006 can be configured to be controlled simultaneously. For example, the mobile vehicle 1000 can have multiple horizontally oriented rotors that can provide lift and/or thrust to the mobile vehicle 1000. The multiple horizontally oriented rotors can be actuated to provide vertical takeoff, vertical landing, and hovering capabilities to the mobile vehicle 1000. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the mobile vehicle 1000 (e.g., with respect to up to three degrees of translation and up to three degrees of rotation).

The communication system 1010 enables communication between the mobile vehicle 1000 and the remote terminal 1030. As shown in FIG. 10, the remote terminal includes a communication system 1040 and a transmission link 1014 can be established between the communication system 1010 of the mobile vehicle 1000 and the communication system 1040 of the remote terminal 1030. Each of the communication systems 1010 and 1040 may include any number of transmitters, receivers, and/or transceivers suitable for wireless communication. The communication may be a one-way communication, such that data can be transmitted in only one direction. For example, a one-way communication may involve only the mobile vehicle 1000 transmitting data to the remote terminal 1030, or vice-versa. The data may be transmitted from one or more transmitters of the communication system 1010 to one or more receivers of the communication system 1040, or vice-versa. Alternatively, the communication may be a two-way communication, such that data can be transmitted in both directions between the mobile vehicle 1000 and the remote terminal 1030. The two-way communication can involve transmitting data from one or more transmitters of the communication system 1010 to one or more receivers of the communication system 1040, and vice-versa. In some embodiments, the transmission link 1014 may include a Wi-Fi link, a software-defined radio (SDR) link, or a telecommunication network. In some embodiments, a server may be used as a relay station for forwarding data between the remote terminal 1030 and the mobile vehicle 1000.

In some embodiments, the remote terminal 1030 can provide control data to one or more of the mobile vehicle 1000, the carrier 1002, and the payload 1004 and receive information from one or more of the mobile vehicle 1000, the carrier 1002, and the payload 1004 (e.g., position and/or motion information of the mobile vehicle 1000, the carrier 1002, or the payload 1004; data sensed by the payload 1004 such as image data captured by a camera as the payload 1004). In some embodiments, control data/instructions from the remote terminal 1030 may include instructions for relative positions, movements, actuations, or controls of the mobile vehicle 1000, the carrier 1002, and/or the payload 1004. For example, the control data may result in a modification of the location and/or orientation of the mobile vehicle 100 (e.g., via control of the propulsion system 1006), or a movement of the payload 1004 with respect to the mobile vehicle 1000 (e.g., via control of the carrier 1002). The control data from the remote terminal 1030 may result in control of the payload 1004, such as control of the operation of a camera or other image capturing device as the payload 1004 (e.g., taking still or moving pictures, zooming in or out, turning on or off, switching imaging modes, change image resolution, changing focus, changing depth of field, changing exposure time, changing viewing angle or field of view).

In some embodiments, the communications from the mobile vehicle 1000, the carrier 1002, and/or the payload 1004 may include information from one or more sensors (e.g., a positioning device as the payload 1004). The communications may include sensed information from one or more different types of sensors (e.g., GPS sensors, motion sensors, inertial sensor, proximity sensors, and/or image sensors). Such information may pertain to the position (e.g., location, orientation), movement, or acceleration of the mobile vehicle 1000, the carrier 1002, and/or the payload 1004. Such information from the payload 1004 may include data captured by the payload 1004 or a sensed state of the payload 1004.

In some embodiments, the carrier 1002 and the payload 1004 can each include a communication circuit configured to communicate with the remote terminal 1030, such that the remote terminal 1030 can communicate with and control each of the mobile vehicle 1000, the carrier 1002, and the payload 1004 independently.

The memory 1012 can store one or more computer programs and/or the like needed to control the operation of the mobile vehicle 1000, such as the operation of the carrier 1002, the payload 1004, and the propulsion system 1006. The memory 1012 can further store one or more computer programs that, when executed, cause part or all of a method consistent with the disclosure, such as one of the example methods describe in this disclosure, to be performed, e.g., by the processor 1008. The memory 1012 can include a computer readable storage medium, which can include at least one of a static random access memory (SRAM), a dynamic random access memory (DRAM), an erasable programmable read only memory (EPROM), an electrically erasable programmable read-only memory (EEPROM), or a flash memory such as a USB memory. The memory 1012 may be disposed inside the mobile vehicle 1000, and it may be configured to be detachable from the mobile vehicle 1000.

The processor 1008 may be disposed in the mobile vehicle 1000, and may be configured to execute the computer program and/or instructions stored in the memory 1012 to perform part or all of a method consistent with the disclosure, such as one of the example methods described in this disclosure. In some embodiments, the processor may be a central processing unit (CPU), a microprocessor (MPU), a digital signal processor (DSP), or a field programmable gate array (FPGA).

In some embodiment, when the computer program stored in the memory 1012 is executed by the processor 1008, the processor 1008 may be caused to determine a processing task associated with the mobile vehicle 1000, and determine one or more processing resources for performing the processing task based at least partially on characteristics of the processing task, including whether to perform the processing task locally at the mobile vehicle 1000 or remotely at the remote terminal 1030.

In some embodiments, if the processing task is related to movement of the mobile vehicle 1000, then the processing task is performed locally at the mobile vehicle 1000 by, e.g., using the processor 1008. On the other hand, if the processing task is not related to movement of the mobile vehicle 1000, then the processing task is performed remotely at the remote terminal 1030 by, e.g., using a processor 1032 of the remote terminal 1030. In some embodiments, if it is determined to perform the processing task remotely at the remote terminal 1030, at least one of data or instructions related to the processing task may need to be first transmitted to the remote terminal 1030 by using the transmission link 1014 between the mobile vehicle 1000 and the remote terminal 1030 described above. After receiving the data and/or instructions related to the processing task, the processor 1032 of the remote terminal 1030 may perform the processing task and generate the processing result, then the processing result may be transmitted to the mobile vehicle 1000.

In some embodiments, before the at least one of data or instructions is transmitted to the remote terminal 1030, auxiliary information may be added to the at least one of data or instructions. The auxiliary information may include one or more of a timestamp, information related to one or more of an attitude, a speed, and a position of the mobile vehicle 1000, and information related to an attitude of the carrier 1002 arranged at the mobile vehicle 1000. As such, time synchronization and data synchronization may be achieved.

In some embodiments, as shown in FIG. 10, the mobile vehicle 1000 further includes an imaging device 1016. The imaging device 1016 may include a camera carried by the mobile vehicle 1000 and be configured to acquire an image of, e.g., the surrounding of the mobile vehicle 1000. In some embodiments, the image may be subject to an image processing task. As such, the processor 1008 of the mobile vehicle 1000 may further be configured to determine that the processing task includes an image processing task, and determine one or more processing resources by determining to perform the image processing task remotely. After it is determined that the image is subject to the image processing task, the image processing task may need to be performed remotely at the remote terminal 1030. As such, the image may be transmitted to the remote terminal 1030 by using the communication system 1010 via the communication link 1014, such that the image processing task may be performed by the processor 1032 of the remote terminal 1030.

In some embodiments, a region of interest (ROI) of the image may be determined by using the processor 1008 of the mobile vehicle 1000 before the image is transmitted to the remote terminal 1030 in order to reduce the time needed to perform the image processing task remotely at the remote terminal 1030 and to improve the accuracy of the image processing task. In some embodiments, determining the region of interest of the image may include identifying a coordinate of a target object in a previously-acquired image and determining a region in the image surrounding the coordinate of the target object as the region of interest. In some embodiments, the ROI, rather than the entire image, can be transmitted to the remote terminal 1030. In some other embodiments, the ROI can be first transmitted and the remaining part of the image can be transmitted after the transmission of the ROI is completed. Transmitting the ROI only rather than the entire image or transmitting the ROI before transmitting other part of the image can reduce the time needed to perform the image processing task remotely at the remote terminal. In some embodiments, to improve the accuracy of the image processing task, the resolution of the ROI of the image may be increased while the resolution of the remaining part of the image may remain unchanged or be reduced. In some embodiments, the ROI of the image may be transmitted to the remote terminal 1030 for at least two times to further ensure the accuracy of the image processing task.

In order to optimize the use of the processing power of the mobile vehicle 1000, in some embodiments, the image may be transmitted to the remote terminal 1030 without performing an image signal processing (ISP) on the image. As such, the image may be directly transmitted from a sensor of the camera to an idle channel of the transmission link 1014 and then to the remote terminal via that channel such that the image can be processed by an image processor, such as the processor 1008 of the mobile vehicle 1000.

In some embodiments, in order to alleviate the computation load on the processor 1032 of the remote terminal, a preliminary processing may be performed by using the processor 1008 of the mobile vehicle 1000 on the image before the image is transmitted to the remote terminal 1030. As such, the computation load of the remote terminal 1030 may be partly distributed to the mobile vehicle 1000.

In some embodiments, as shown in FIG. 10, the mobile vehicle 1000 further includes a positioning device 1018. The positioning device 1018 may include a GPS receiver carried by the mobile vehicle 1000 and be configured to identify the location of the mobile vehicle 1000. In some embodiments, the positioning device 1018 may identify the location of the mobile vehicle 1000 in real time. In other embodiments, the positioning device 1018 may identify the location of the mobile vehicle 1000 at predetermined time intervals.

After the location of the mobile vehicle 1000 is identified, whether the location of the mobile vehicle 1000 is subject to a route query task can be determined. If it is determined that the location aerial vehicle is subject to a route query task, the processor 1008 may be used to generate a route query.

Further, the processor 1008 of the mobile vehicle 1000 may further be configured to determine that the processing task includes a route query task, and determine one or more processing resources by determining to perform the route query task remotely. After the processor 1008 determines that the location of aerial vehicle is subject to the route query task, the location of the mobile vehicle 1000 and the route query may be transmitted to the remote terminal 1030 by the communication system 1010 via the transmission link 1014.

After the remote terminal 1030 receives the location of the mobile vehicle 1000 and the route query from the mobile vehicle, the processor 1032 of the remote terminal may be used to perform the route query task, generate a query result, and transmit the query result to the mobile vehicle 1000. The mobile vehicle 1000 can receive the query result and perform further operation, such as re-routing the mobile vehicle, based on the query result. As such, after the mobile vehicle 1000 receives the query result from the remote terminal 1030, the processor 1008 may be used to update the map stored in the mobile vehicle 1000 using a change in a depth map.

In some embodiments, in addition to the operations described above, the processor 1008 can be further configured to execute the computer program stored in the memory 1012 to execute part or all of a method consistent with the disclosure (that is not explicitly described above to be executed by the processor 1008), such as one of the example methods described in this disclosure. The implementation principles and technical effects of the operations of the processor 1008 are same as or similar to those of a corresponding method, and hence details thereof are not described herein again.

Figure 11:
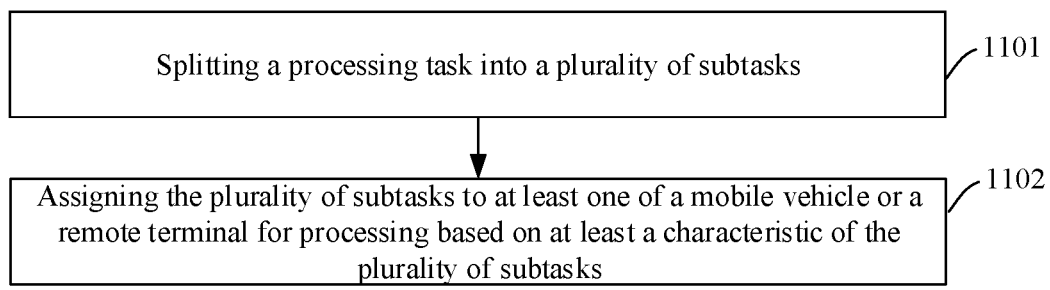
FIG. 11 is a flowchart of a data processing method according to an embodiment of the present disclosure.

FIG. 11 is a flowchart of a data processing method according to an embodiment of the present disclosure. As shown in FIG. 11, at 1101, a processing task is split into a plurality of subtasks. At 1102, the plurality of subtasks are assigned to at least one of a mobile vehicle or a remote terminal for processing based on at least a characteristic of the plurality of subtasks. In some embodiments, the processing task may include one or more of an image processing task, a trajectory planning task, a map update task, and a route query task. In addition, in some embodiment, the plurality of subtasks may include one or more of an image acquisition subtask, an image recognition subtask, an information acquisition subtask, an object identification subtask, a related-information acquisition subtask, a planning subtask, a change acquisition subtask, an updating subtask, a location identification subtask, and a route determination subtask. In particular, the plurality of subtasks may be processed in different orders.

In some embodiments, each of the plurality of subtasks can have a priority and the assignment of the plurality of subtasks can be based at least partially on the priorities of the subtasks. For example, a subtask having a priority higher than a threshold priority can be assigned to the mobile vehicle and can be, e.g., performed more timely. On the other hand, a subtask having a priority lower than the threshold priority can be assigned to the remote terminal and can be, e.g., performed with a higher accuracy. In some embodiments, the priority of a subtask can depend on various factors such as, for example, the characteristic of the subtask, the amount of data involved, and/or the computation or processing power needed.

In some embodiments, the plurality of subtasks may include a first subtask and a second subtask, where the first subtask and the second subtask may have different priorities. In some embodiments, the first subtask may be processed by the mobile vehicle (e.g., because the first subtask has a higher priority), and the second subtask may be processed by the remote terminal (e.g., because the second subtask has a lower priority). As such, assigning the plurality of subtasks to at least one of the mobile vehicle or the remote terminal for processing based on at least the characteristic of the plurality of subtasks may include performing the first subtask at the mobile vehicle and sending the second subtask to the remote terminal.

A subtask may be processed at the mobile vehicle or at the remote terminal. In some embodiments, due to the weight limit and the safety requirement of the mobile vehicle, the subtask being processed at the mobile vehicle may be a subtask that is related to the movement of the mobile vehicle and/or the subtask being processed at the remote terminal may be a subtask that is not related to the movement of the mobile vehicle. In some embodiments, a subtask that involves relatively small data amount or needs less resources can be performed at the mobile vehicle. For example, a data processing amount of a subtask being processed at the mobile vehicle can be smaller than a data processing amount of a subtask being processed at the remote terminal, a data processing speed of a subtask being processed at the mobile vehicle can be slower than a data processing speed of a subtask being processed at the remote terminal, a data storage amount of a subtask being processed at the mobile vehicle can be smaller than a data storage amount of a subtask being processed at the remote terminal, an amount of computation power needed for a subtask being processed at the mobile vehicle can be less than an amount of computation power needed for a subtask being processed at the remote terminal, and/or an amount of electric power needed for a subtask being processed at the mobile vehicle can be less than an amount of electric power needed for a subtask being processed at the remote terminal.

In some embodiments, the first subtask may be processed at the mobile vehicle to generate a first subtask result. The first subtask result may be transmitted to the remote terminal through a transmission link between the mobile vehicle and the remote terminal. Subsequently, the second subtask may be processed at the remote terminal based on the first subtask result to generate a final processing result.

In some embodiments, the second subtask may be processed at the remote terminal to generate a second subtask result. The second subtask result may be transmitted to the mobile vehicle through a transmission link between the mobile vehicle and the remote terminal. Subsequently, the first subtask may be processed at the mobile vehicle based on the second subtask result to generate a final processing result. In some embodiments, the final processing result may be transmitted to the remote terminal for further processing. In some embodiments, before the second subtask is processed at the remote terminal, acquired data (e.g., an acquired image, a location of the mobile vehicle, etc.) may be transmitted to the remote terminal from the mobile vehicle, such that the remote terminal may use the acquired data to process the second subtask.

In some embodiments, the processing task includes an image processing task, and the plurality of subtasks include an image acquisition subtask and an image recognition subtask. The image acquisition subtask may be assigned to the mobile vehicle because the payload (e.g., a camera) carried by the mobile vehicle can be used to acquire an image. Further, since the image recognition subtask may require more processing power, the image recognition subtask may be assigned to the remote terminal which may have a relatively higher processing power. Thus, the image acquired by the payload of the mobile vehicle can be transmitted to the remote terminal for the remote terminal to recognize the image.

In some embodiments, the processing task includes a trajectory planning task, and the plurality of subtasks can include at least one of an information acquisition subtask, an object identification subtask, a related-information acquisition subtask, or a planning subtask.

The information acquisition subtask can be performed at the mobile vehicle, e.g., by a sensing device disposed at the mobile vehicle, and can include acquiring information of a target object. The sensing device may include a global positioning system (GPS) sensor, a motion sensor, an inertial sensor, a proximity sensors, and/or an image sensor. In some embodiments, the sensing device may be used to provide data regarding the environment surrounding the mobile vehicle, such as weather conditions, proximity to potential obstacles, location of geographical features, location of manmade structures, and/or the like. After the information of the target object is acquired, the information of the target object can be transmitted to the remote terminal and the object identification subtask can be performed, e.g., at the remote terminal, to identify the target object based on the information of the target object.

After the target object is identified, the related-information acquisition subtask can be performed, e.g., at the remote terminal, to acquire related information of the target object. In some embodiments, the related information may include one or more of a position, an attitude, and a speed of the target object relative to the mobile vehicle. After the related information of the target object is acquired, the related information of the target object can be transmitted to the mobile vehicle, and the planning subtask can be performed, e.g., at the mobile vehicle, to plan a trajectory for the mobile vehicle based at least partially on the related information of the target object, such that the mobile vehicle may move along a planned trajectory, e.g., to avoid the target object or towards the target object.

In some embodiments, since the information of the target object can be acquired by using a payload carried by the mobile vehicle, the information acquisition subtask may be assigned to the mobile vehicle. In some embodiments, since identifying the target object and acquiring related information of the target object may require more processing power, the object identification subtask and the related-information acquisition subtask may be assigned to the remote terminal. In some embodiments, because the processing power needed to perform the planning subtask may be relatively small, the planning subtask can be assigned to the mobile vehicle. For example, the planning subtask may need less processing power than the identification subtask and the related-information acquisition subtask.

In some embodiments, the processing task includes a map update task, and the plurality of subtasks can include at least one of a change acquisition subtask and an updating subtask. In some embodiments, the change acquisition subtask can be assigned to the mobile vehicle and the sensing device carried by the mobile vehicle described above may be used to determine the location of the mobile vehicle and the objects surrounding the mobile vehicle to, e.g., acquire a change of a map. In some embodiments, because the map may require a large amount of storage space, the map may be stored at the remote terminal. As such, the change of the map can be transmitted to the remote terminal and the updating subtask may be assigned to the remote terminal to update the map based on an amount of change of the map acquired by the mobile vehicle.

In some embodiments, the processing task includes a route query task, and the plurality of subtasks include at least one of a location identification subtask or a route determination subtask. In some embodiments, the location identification subtask can be assigned to the mobile vehicle and the sensing device carried by the mobile vehicle described above may be used to identify (determine) the location of the mobile vehicle. In some embodiments, because the calculation of a route may require more processing power, the route determination subtask may be assigned to the remote terminal which may have a relatively higher processing power than the mobile vehicle.

Figure 12:
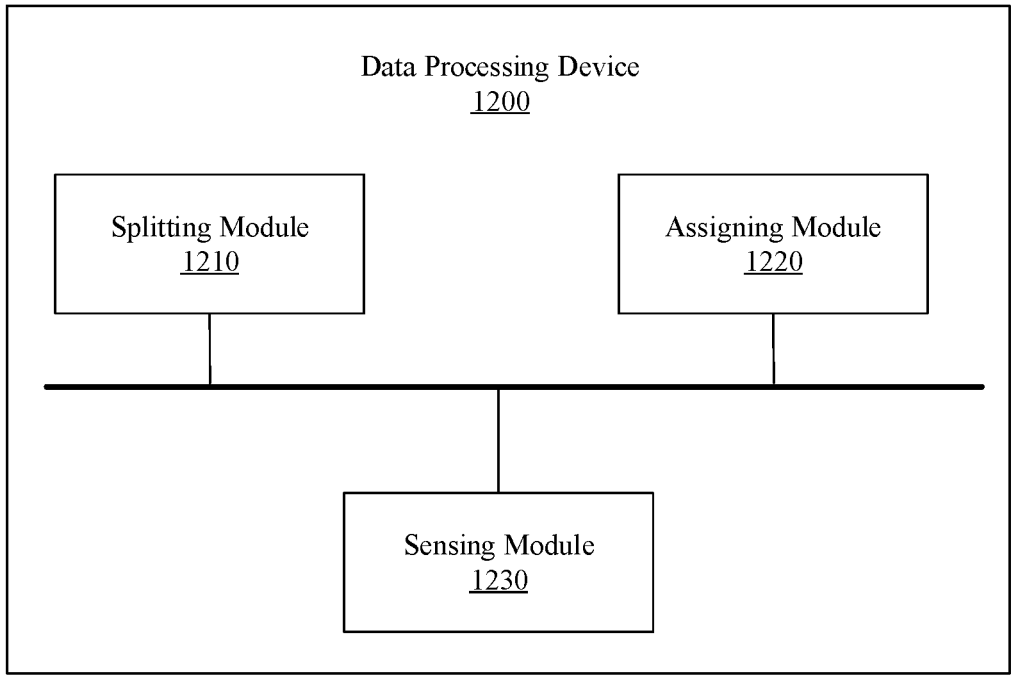
FIG. 12 is a block diagram of a data processing device according to an embodiment of the present disclosure.

FIG. 12 is a block diagram of a data processing device 1200 according to an embodiment of the present disclosure. As shown in FIG. 12, the data processing device 1200 includes a splitting module 1210 and an assigning module 1220. The splitting module 1210 may be communicatively connected to the assigning module 1020 through a direct or an indirect connection.

The splitting module 1210 may be configured to split a processing task into a plurality of subtasks, and the assigning module 1220 may be configured to assign the plurality of subtasks to at least one of a mobile vehicle or a remote terminal for processing based on at least a characteristic of the plurality of subtasks. In some embodiments, the processing task may include one or more of an image processing task, a trajectory planning task, a map update task, and a route query task. In some embodiment, the plurality of subtasks may include one or more of an image acquisition subtask, an image recognition subtask, an information acquisition subtask, an object identification subtask, a related-information acquisition subtask, a planning subtask, a change acquisition subtask, an updating subtask, a location identification subtask, and a route determination subtask. In some embodiments, the plurality of subtasks may be processed in different orders.

In some embodiments, each of the plurality of subtasks can have a priority and the assignment of the plurality of subtasks can be based at least partially on the priorities of the subtasks. For example, a subtask having a priority higher than a threshold priority can be assigned to the mobile vehicle and can be, e.g., performed more timely. On the other hand, a subtask having a priority lower than the threshold priority can be assigned to the remote terminal and can be, e.g., performed with a higher accuracy. In some embodiments, the priority of a subtask can depend on various factors such as, for example, the characteristic of the subtask, the amount of data involved, and/or the computation or processing power needed.

In some embodiments, the plurality of subtasks may include a first subtask and a second subtask, where the first subtask and the second subtask may have different priorities. In some embodiments, the first subtask may be processed by the mobile vehicle, and the second subtask may be processed by the remote terminal. As such, the assigning module 1220 may assign the first subtask to the mobile vehicle and the second subtask to the remote terminal.

In some embodiments, the processing task includes an image processing task and the splitting module 1210 can split the image processing task into at least one of an image acquisition subtask or an image recognition subtask. In some embodiments, the assigning module 1220 may assign the image acquisition subtask to the mobile vehicle because the payload (e.g., a camera) carried by the mobile vehicle can be used to acquire an image. Further, since the image recognition subtask may require more processing power, the assigning module 1220 may assign the image recognition subtask to the remote terminal which may have a relatively higher processing power.

In some embodiments, the data processing device 1200 may be carried by the mobile vehicle and, as shown in FIG. 12, further includes a sensing module 1230. The sensing module 1230 may be configured to obtain data from a sensing device, such as a global positioning system (GPS) sensor, a motion sensor, an inertial sensor, a proximity sensors, or an image sensor. In some embodiments, the sensing module 1230 may be configured to obtain data regarding the environment surrounding the mobile vehicle, such as weather conditions, proximity to potential obstacles, location of geographical features, location of manmade structures, and/or the like, from a sensing device.

In some embodiments, the processing task includes a trajectory planning task, and the splitting module 1210 can split the trajectory planning task into at least one of an information acquisition subtask, an object identification subtask, a related-information acquisition subtask, or a planning subtask. In some embodiments, the assigning module 1220 can assign the information acquisition subtask and the planning subtask to the mobile vehicle and assign the object identification subtask and the related-information acquisition subtask to the remote terminal.

The mobile vehicle can perform the information acquisition subtask, e.g., through the sensing module 1230, to acquire information of a target object. After the information of the target object is acquired, the information of the target object can be transmitted to the remote terminal and the remote terminal can identify the target object based on the information of the target object. The remote terminal can perform the related-information acquisition subtask to acquire related information of the target object after the target object is identified. In some embodiments, the related information may include one or more of a position, an attitude, and a speed of each of the target object relative to the mobile vehicle. In some embodiments, after the related information of the target object is acquired, the related information of the target object can be transmitted to the mobile vehicle and the mobile vehicle can perform the planning subtask to plan a trajectory for the mobile terminal based at least partially on the related information of the target object, such that the mobile vehicle may move along a planned trajectory, e.g., to avoid the target object or towards the target object.

In some embodiments, since the information of the target object can be acquired by using a payload carried by the mobile vehicle, the assigning module 1220 may assign the information acquisition subtask to the mobile vehicle. In some embodiments, since identifying the target object and acquiring related information of the target object may require more processing power, the assigning module 1220 may assign the object identification subtask and the related-information acquisition subtask to the remote terminal. In some embodiments, because the processing power needed to perform the planning subtask may be relatively small, the planning subtask can be assigned to the mobile vehicle. For example, the planning subtask may need less processing power than the identification subtask and the related-information acquisition subtask.

In some embodiments, the processing task includes a map update task, and the splitting module 1210 can split the map update task into at least one of a change acquisition subtask and an updating subtask. In some embodiments, the assigning module 1220 can assign the change acquisition subtask to the mobile vehicle and the mobile vehicle can, e.g., through the sensing module 1230 described above, determine the location of the mobile vehicle and the objects surrounding the mobile vehicle to, e.g., acquire a change of a map. In some embodiments, because the map may require a large amount of storage space, the map may be stored at the remote terminal. As such, the assigning module 1220 can assign the updating subtask to the remote terminal to update the map based on an amount of change of the map acquired by the mobile vehicle.

In some embodiments, the processing task includes a route query task, and the splitting module 1210 can split the route query task into at least one of a location identification subtask or a route determination subtask. In some embodiments, the sensing module 1230 described above may be used to identify (determine) the location of the mobile vehicle. After the location of the mobile vehicle is identified, the location information can be transmitted to the remote terminal for the remote terminal to perform the route determination subtask to determine a route.

The data processing device of the present disclosure may be used to implement part or all of a method consistent with the disclosure, such as one of the above-described example methods. For example, the data processing device consistent with the disclosure can include one or more additional modules each being configured to perform one or more processes of a method consistent with the disclosure, such as one of the example methods described above. The implementation principles and technical effects of the data processing device are same as or similar to those of a corresponding method, and hence details thereof are not described herein again.

Figure 13:
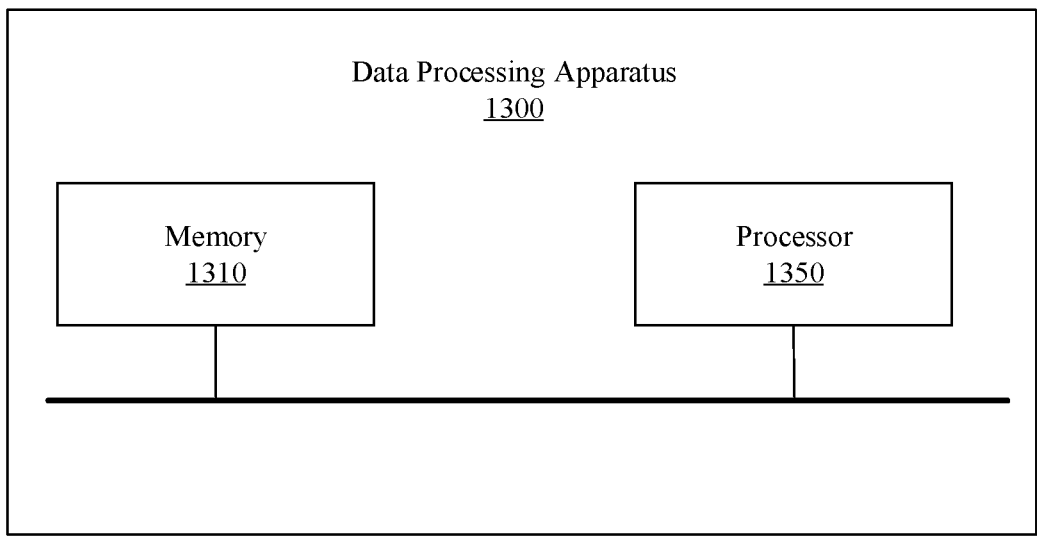
FIG. 13 is a structural diagram of a data processing apparatus according to an embodiment of the present disclosure.

FIG. 13 is a schematic structural diagram of a data processing apparatus 1300 according to an embodiment of the present disclosure. The data processing apparatus 1300 is configured to perform a method consistent with the present disclosure, such as one of the example methods described in this disclosure. As shown in FIG. 13, the data processing apparatus 1300 includes a memory 1310 storing a computer program and a processor 1350 configured to execute the computer program to perform part or all of a method consistent with the present disclosure, such as one of the example methods described in this disclosure.

The memory 1310 can include a computer readable storage medium, which can include at least one of a static random access memory (SRAM), a dynamic random access memory (DRAM), an erasable programmable read only memory (EPROM), an electrically erasable programmable read-only memory (EEPROM), or a flash memory such as a USB memory.

The processor 1350 can include a central processing unit (CPU), a microprocessor (MPU), a digital signal processor (DSP), or a field programmable gate array (FPGA). In some embodiments, the processor 1350 may be configured to execute the computer program stored in the memory 1310 to split a processing task into a plurality of subtasks, and assign the plurality of subtasks to at least one of the mobile vehicle or the remote terminal for processing based on at least a characteristic of the plurality of subtasks. In particular, the plurality of subtasks may be processed in different orders.

In some embodiments, the processor 1350 can split the processing task into a first subtask and a second subtask, where the first subtask and the second subtask may have different priorities. In some embodiments, the first subtask may be processed by the mobile vehicle, and the second subtask may be processed by the remote terminal. As such, the processor 1350 may assign the first subtask to the mobile vehicle and the second subtask to the remote terminal. In some embodiments, the processor 1350 may perform the first subtask.

In some embodiments, the processing task may include an image processing task, and the processor 1350 can split the image processing task into at least one of an image acquisition subtask or an image recognition subtask. As such, the processor 1350 may assign the image acquisition subtask to the mobile vehicle and the image recognition subtask to the remote terminal. In some embodiments, the processor 1350 may perform the image acquisition subtask, e.g., with the aid of an imaging device carried by the mobile vehicle.

In some embodiments, the processing task may include a trajectory planning task, and the processor 1350 can split the trajectory planning task into at least one of an information acquisition subtask, an object identification subtask, a related-information acquisition subtask, or a planning subtask. As such, the processor 1350 may assign the acquisition subtask and the planning subtask to the mobile vehicle, and the identification subtask and the related-information acquisition subtask to the remote terminal. In some embodiments, the processor 1350 may perform the acquisition subtask (e.g., with the aid of a sensing device carried by the mobile vehicle) and the planning subtask.

In some embodiments, the processing task may include a map update task, and the processor 1350 can split the map update task into at least one of a change acquisition subtask or an updating subtask. As such, the processor 1350 may assign the change acquisition subtask to the mobile vehicle and the updating subtask to the remote terminal. In some embodiments, the processor 1350 may perform the change acquisition subtask, e.g., with the aid of the sensing device carried by the mobile vehicle.

In some embodiments, the processing task may include a route query task, and the processor 1350 can split the route query task into at least one of a location identification subtask or a route determination subtask. As such, the processor 1350 may assign the location identification subtask to the mobile vehicle and the route determination subtask to the remote terminal. In some embodiments, the processor 1350 may perform the location identification subtask, e.g., with the aid of the sensing device carried by the mobile vehicle.

In some embodiments, in addition to the operations described above, the processor 1350 can be further configured to perform other operations consistent with the disclosure. For example, the processor 1350 can be further configured to execute part or all of a method consistent with the disclosure (that is not explicitly described to be executed by the processor 1350), such as one of the example methods described in this disclosure. For the operation of the data processing apparatus 1300, reference can be made to corresponding example methods described in this disclosure, and hence detailed description thereof is omitted.

The data processing method, data processing device, and data processing apparatus consistent with the disclosure can also be implemented in the mobile vehicle 1000 described above in connection with FIG. 10. In some embodiments, the memory 1012 can store a computer program that, when executed, causes a data processing method consistent with the disclosure to be performed, and the processor 1008 can execute the computer program stored in the memory 1012 to perform part or all of the method consistent with the disclosure, such as one of the above-described example data processing methods.

In some embodiments, the processor 1008 can be configured to split a processing task into a plurality of subtasks, and assign the plurality of subtasks to at least one of the mobile vehicle 1000 or the remote terminal 1030 for processing based on at least a characteristic of the plurality of subtasks.

In some embodiments, the processor 1008 can split the processing task into a first subtask and a second subtask, where the first subtask and the second subtask may have different priorities. In some embodiments, the first subtask may be processed by the mobile vehicle 1000, and the second subtask may be processed by the remote terminal 1030. As such, the processor 1008 may be configured to assign the first subtask to the mobile vehicle 1000 and the second subtask to the remote terminal 1030. In some embodiments, the processor 1008 can perform the first subtask, e.g., with or without aid of other components of the mobile vehicle 1000.

A subtask may be processed at the mobile vehicle 1000 or at the remote terminal 1030. In some embodiments, due to the weight limit and the safety requirement of the mobile vehicle 1000, the subtask being processed at the mobile vehicle 1000 may be a subtask that is related to the movement of the mobile vehicle 1000 and/or the subtask being processed at the remote terminal 1030 may be a subtask that is not related to the movement of the mobile vehicle 1000. In some embodiments, a subtask that involves relatively small data amount or needs less resources can be performed at the mobile vehicle 1000. For example, a data processing amount of a subtask being processed at the mobile vehicle 1000 can be smaller than a data processing amount of a subtask being processed at the remote terminal 1030, a data processing speed of a subtask being processed at the mobile vehicle 1000 can be slower than a data processing speed of a subtask being processed at the remote terminal 1030, a data storage amount of a subtask being processed at the mobile vehicle 1000 can be smaller than a data storage amount of a subtask being processed at the remote terminal 1030, an amount of computation power needed for a subtask being processed at the mobile vehicle 1000 can be less than an amount of computation power needed for a subtask being processed at the remote terminal 1030, and/or an amount of electric power needed for a subtask being processed at the mobile vehicle 1000 can be less than an amount of electric power needed for a subtask being processed at the remote terminal 1030.

In some embodiments, the first subtask may be processed at the mobile vehicle 1000 to generate a first subtask result. The first subtask result may be transmitted to the remote terminal 1030 through the transmission link 1014 between the mobile vehicle 1000 and the remote terminal 1030. Subsequently, the second subtask may be processed at the remote terminal 1030 based on the first subtask result to generate a final processing result.

In some embodiments, the second subtask may be processed at the remote terminal 1030 to generate a second subtask result. The second subtask result may be transmitted to the mobile vehicle 1000 through the transmission link 1014 between the mobile vehicle 1000 and the remote terminal 1030. Subsequently, the first subtask may be processed at the mobile vehicle 1000 based on the second subtask result to generate a final processing result. In some embodiments, the final processing result may be transmitted to the remote terminal 1030 for further processing. In some embodiments, before the second subtask is processed at the remote terminal 1030, acquired data (e.g., an acquired image, a location of the mobile vehicle 1000, etc.) may be transmitted to the remote terminal 1030 from the mobile vehicle 1000, such that the remote terminal 1030 may use the acquired data to process the second subtask.

In some embodiments, the processing task includes an image processing task, and the processor 1008 can split the image processing task into at least one of an image acquisition subtask or an image recognition subtask. In some embodiments, the processor 1008 may be configured to assign the image acquisition subtask to the mobile vehicle 1000 as the payload 1004 (e.g., a camera) carried by the carrier 1002 can be used to acquire an image. Further, since the image recognition subtask may require more processing power, the processor 1008 may be configured to assign the image recognition subtask to the remote terminal 1030 which may have a relatively higher processing power.

In some embodiments, the processing task includes a trajectory planning task, and the processor 1008 can split the trajectory planning task into at least one of an information acquisition subtask, an object identification subtask, a related-information acquisition subtask, or a planning subtask. In some embodiments, the processor 1008 can assign the information acquisition subtask and the planning subtask to the mobile vehicle 1000 and assign the object identification subtask and the related-information acquisition subtask to the remote terminal 1030. For example, the processor 1008 can perform the information acquisition subtask with the aid of a sensing device carried by the mobile vehicle 1000 to acquire information of a target object. The sensing device may include a global positioning system (GPS) sensor, a motion sensor, an inertial sensor, a proximity sensors, or an image sensor, such as the imaging device 1016 and/or the positioning device 1018. In some embodiments, the sensing device may be used to provide data regarding the environment surrounding the mobile vehicle 1000, such as weather conditions, proximity to potential obstacles, location of geographical features, location of manmade structures, and/or the like. After the information of the target object is acquired, the processor 1008 can control the communication system 1010 to transmit the information of the target object to the remote terminal 1030 via the transmission link 1014 for the remote terminal 1030 to perform the object identification subtask to identify the target object based on the information of the target object.

After the target object is identified, the remote terminal 1030 can perform the related-information acquisition subtask to acquire related information of the target object. In some embodiments, the related information may include one or more of a position, an attitude, and a speed of the target object relative to the mobile vehicle 1000. After the related information of the target object is acquired, the remote terminal 1030 can transmit the related information of the target object to the mobile vehicle 1000 via the transmission link 1014, and the mobile vehicle 1000, such as the processor 1008, can perform the planning subtask to plan a trajectory for the mobile vehicle 1000 based at least partially on the related information of the target object, such that the mobile vehicle 1000 may move along a planned trajectory, e.g., to avoid the target object or towards the target object.

In some embodiments, since the information of the target object can be acquired by using the payload 1004 carried by the carrier 1002 of the mobile vehicle 1000, the processor 1008 may be configured to assign the information acquisition subtask to the mobile vehicle 1000. In some embodiments, since identifying the target object and acquiring related information of the target object may require more processing power, the processor 1008 may be configured to assign the object identification subtask and the related-information acquisition subtask to the remote terminal 1030. In some embodiments, because the processing power needed to perform the planning subtask may be relatively small, the processor 1008 can assign the planning subtask to the mobile vehicle 1000. For example, the planning subtask may need less processing power than the identification subtask and the related-information acquisition subtask.

In some embodiments, the processing task includes a map update task, and the processor 1008 can split the map update task into at least one of a change acquisition subtask or an updating subtask, and assign the change acquisition subtask to the mobile vehicle 1000 and the updating subtask to the remote terminal 1030. In some embodiments, the processor 1008 can perform the change acquisition subtask, e.g., with the aid of the sensing device described above, by, e.g., determining the location of the mobile vehicle and the objects surrounding the mobile vehicle to acquire a change of a map. Since the map may require a large amount of storage space, the map may be stored at the remote terminal 1030. As such, the processor 1008 can control the communication system 1010 to transmit the change of the map to the remote terminal 1030 via the transmission link 1014, for the remote terminal 1030 to perform the updating subtask to update the map.

In some embodiments, the processing task includes a route query task, and the processor 1008 can split the route query task into at least one of a location identification subtask or a route determination subtask, and assign the location identification subtask to the mobile vehicle 1000 and the route determination subtask to the remote terminal 1030. In some embodiments, the processor 1008 can perform the location identification subtask, e.g., with the aid of the sensing device described above, e.g., to identify (determine) the location of the mobile vehicle 1000. As such, the processor 1008 may be configured to assign the location identification subtask to the mobile vehicle 1000. The processor 1008 can control the communication system 1010 to transmit the location information of the mobile vehicle 1000 to the remote terminal 1030 via the transmission link 1014, for the remote terminal 1030, which may have a relatively higher processing power than the mobile vehicle 1000, to perform the route determination subtask, which may require more processing power.

In some embodiments, in addition to the operations described above, the processor 1008 can be further configured to execute the computer program stored in the memory 1012 to execute part or all of a method consistent with the disclosure (that is not explicitly described above to be executed by the processor 1008), such as one of the example data processing methods described in this disclosure. The implementation principles and technical effects of the operations of the processor 1008 are same as or similar to those of a corresponding method, and hence details thereof are not described herein again.

A person skilled in the art would understand that all or part of the processes of the methods in the embodiments may be implemented by a computer program instructing relevant hardware. The program may be stored in a computer readable storage medium. When the program is run, it can cause one or more processors to perform at least a part of a method consistent with the disclosure, such as one of the example methods described above. The storage medium may be a magnetic disk, an optical disk, a read-only memory (ROM) or a random access memory (RAM), or the like.

The foregoing merely describes the example embodiments of the present disclosure and is not intended to limit the present disclosure. Any modification, equivalent replacement, or improvement made without departing from the spirit and principle of the present disclosure shall fall within the scope of the disclosure.

What is claimed is:

1. A computation load distribution method comprising:
   determining, by a processor at an aerial vehicle, a processing task associated with sensing data from the aerial vehicle, the aerial vehicle being coupled to a remote terminal via at least one transmission link;
   determining, by the processor, one or more processing resources for performing the processing task based at least partially on characteristics of the processing task, including:

determining whether to perform the processing task at the aerial vehicle or at the remote terminal, including:
  determining to perform the processing task at the remote terminal in response to at least one of:
    a data processing amount of the processing task being greater than a data processing amount threshold,
    a data storage amount of the processing task being greater than a data storage amount threshold, or
    an electric power needed for the processing task being greater than an electric power threshold; and
  determining to perform the processing task at the aerial vehicle in response to at least one of:
    the data processing amount of the processing task being less than the data processing amount threshold,
    the data storage amount of the processing task being less than the data storage amount threshold, or
    the electric power needed for the processing task being less than the electric power threshold;
instructing, by the processor, the aerial vehicle or the remote terminal to perform the processing task according to a result of determining the one or more processing resources; and
controlling the aerial vehicle based on a processing result of the processing task.

2. The computation load distribution method of claim 1, wherein determining whether to perform the processing task at the aerial vehicle or at the remote terminal further includes:
  determining to perform the processing task at the aerial vehicle in response to the processing task being related to movement of the aerial vehicle; and
  determining to perform the processing task at the remote terminal in response to the processing task being not related to the movement of the aerial vehicle.

3. The computation load distribution method of claim 1, further comprising, in response to determining to perform the processing task at the remote terminal:
  transmitting at least one of data or instructions related to the processing task to the remote terminal via the at least one transmission link; and
  receiving a processing result from the remote terminal.

4. The computation load distribution method of claim 3, further comprising, before transmitting the at least one of data or instructions to the remote terminal:
  adding auxiliary information to the data, the auxiliary information including at least one of:
    a timestamp,
    information related to one or more of an attitude, a speed, and a position of the aerial vehicle, or
    information related to an attitude of a carrier arranged at the aerial vehicle.

5. The computation load distribution method of claim 1, further comprising:
  acquiring an image via a camera carried by the aerial vehicle;
  wherein:
    determining the processing task includes determining an image processing task; and
    determining the one or more processing resources further includes determining to perform the image processing task at the remote terminal.

6. The computation load distribution method of claim 5, further comprising:
  determining a region of interest of the image; and
  transmitting the image to the remote terminal.

7. The computation load distribution method of claim 6, wherein:
  determining the region of interest of the image includes:
    identifying a coordinate of a target object in a previously-acquired image; and
    determining a region in the image surrounding the coordinate of the target object as the region of interest; and
  transmitting the image to the remote terminal includes:
    transmitting the region of interest of the image before transmitting a remaining part of the image.

8. The computation load distribution method of claim 6, further comprising, before transmitting the image:
  increasing or reducing a resolution of the region of interest of the image.

9. The computation load distribution method of claim 6, wherein transmitting the image to the remote terminal includes repeatedly transmitting the region of interest for at least two times.

10. The computation load distribution method of claim 6, wherein transmitting the image includes sending the image directly from a sensor of the camera to an idle channel of an image transmission link for transmission without performing an image signal processing on the image using an image processor of the aerial vehicle.

11. The computation load distribution method of claim 6, further comprising:
  performing a preliminary processing on the image before transmitting the image to the remote terminal, the preliminary processing including one or more of a compression, a resolution reduction, and split.

12. The computation load distribution method of claim 6, further comprising:
  adding a timestamp to the image for time synchronization.

13. The computation load distribution method of claim 6, further comprising:
  adding auxiliary information to the image for data synchronization, the auxiliary information including at least one of:
    movement information of the aerial vehicle, including one or more of a position, a speed, and an attitude of the aerial vehicle, or
    related information of components of the aerial vehicle, including attitude information of a gimbal carried by the aerial vehicle.

14. The computation load distribution method of claim 1, further comprising:
  identifying a location of the aerial vehicle; and
  generating a route query;
  wherein:
    determining the processing task includes determining a route query task; and
    determining the one or more processing resources includes determining to perform the route query task at the remote terminal.

15. The computation load distribution method of claim 14, further comprising:
  transmitting the location of the aerial vehicle and the route query to the remote terminal; and
  receiving a query result from the remote terminal.

16. The computation load distribution method of claim 1, further comprising:

updating a map stored in the aerial vehicle using a change in a depth map.

17. The computation load distribution method of claim 1, wherein the processing task includes a trajectory planning task;
the method further comprising:
   transmitting sensing information of one or more surrounding target objects to the remote terminal;
   receiving related information of the one or more surrounding objects from the remote terminal; and
   performing trajectory planning based on the related information of the one or more surrounding target objects.

18. The computation load distribution method of claim 17, wherein the sensing information of the one or more surrounding target objects includes one or more of a position, an attitude, a speed, and an object type.

19. The computation load distribution method of claim 17, wherein the aerial vehicle includes a sensor for sensing the one or more surrounding target objects.

20. The computation load distribution method of claim 1, wherein determining whether to perform the processing task at the aerial vehicle or at the remote terminal further includes:
   determining to perform the processing task at the remote terminal in response to a data processing speed of the processing task being greater than a data processing speed threshold; and
   determining to perform the processing task at the aerial vehicle in response to the data processing speed being less than the data processing speed threshold.

* * * * *